United States Patent
Kim et al.

(10) Patent No.: US 9,578,636 B2
(45) Date of Patent: Feb. 21, 2017

(54) METHOD FOR TRANSMITTING AND RECEIVING CONTROL INFORMATION AND DEVICE FOR SAME

(71) Applicant: LG ELECTRONICS INC., Seoul (KR)

(72) Inventors: Myoungseob Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 14/443,590

(22) PCT Filed: Nov. 19, 2013

(86) PCT No.: PCT/KR2013/010503
§ 371 (c)(1),
(2) Date: May 18, 2015

(87) PCT Pub. No.: WO2014/077654
PCT Pub. Date: May 22, 2014

(65) Prior Publication Data
US 2015/0334684 A1   Nov. 19, 2015

Related U.S. Application Data

(60) Provisional application No. 61/728,202, filed on Nov. 19, 2012.

(51) Int. Cl.
H04W 72/04   (2009.01)
H04B 7/26   (2006.01)
H04L 5/00   (2006.01)

(52) U.S. Cl.
CPC ............. *H04W 72/042* (2013.01); *H04B 7/26* (2013.01); *H04L 5/0053* (2013.01)

(58) Field of Classification Search
None
See application file for complete search history.

(56) References Cited

U.S. PATENT DOCUMENTS

2011/0228724 A1*  9/2011  Gaal .................. H04L 5/001
                                              370/328
2012/0320838 A1* 12/2012  Yang .................. H04W 72/02
                                              370/329

(Continued)

OTHER PUBLICATIONS

Catt, "Resource configuration and search space design for E-PDCCH", 3GPP TSG RAN WG1 Meeting #71, R1-124763, Nov. 12-16, 2012, 7 pgs.

(Continued)

*Primary Examiner* — Hassan Kizou
*Assistant Examiner* — Hashim Bhatti
(74) *Attorney, Agent, or Firm* — Birch, Stewart, Kolasch & Birch, LLP

(57) ABSTRACT

The present invention relates to a wireless communication system and, more particularly, to a method by which a terminal receives an EPDCCH signal in a wireless communication system and a device for the same, the method comprising the steps of receiving a subframe including an EPDCCH set, wherein the EPDCCH set includes a plurality of EPDCCH candidates; and monitoring the plurality of EPDCCH candidates in the EPDCCH set in order to receive the EPDCCH signal, wherein the number of EPDCCH candidates having an aggregation level of L in the EPDCCH set is indicated and is limited to a value of a specific form under a predetermined condition.

10 Claims, 20 Drawing Sheets

EPDCCH candidates for localized ECCE
(Aggregation level = 1, consecutive allocation (i.e., offset = 5))

(56) References Cited

U.S. PATENT DOCUMENTS

| | | | | |
|---|---|---|---|---|
| 2013/0010724 A1* | 1/2013 | Han | ...................... | H04L 5/0007 |
| | | | | 370/329 |
| 2013/0279400 A1* | 10/2013 | Pan | ........................ | H04L 5/001 |
| | | | | 370/315 |
| 2014/0348092 A1* | 11/2014 | Ihm | ...................... | H04J 11/0079 |
| | | | | 370/329 |
| 2015/0029910 A1* | 1/2015 | He | ........................ | H04W 76/02 |
| | | | | 370/280 |

OTHER PUBLICATIONS

LG Electronics, "Details on Search Space and Aggregation Levels", 3GPP TSG RAN WG1 Meeting #71, R1-124982, Nov. 12-16, 2012, 12 pgs.

New Postcom, "Remaining details of search space design for EPDCCH" 3GPP TSG RAN WG1 Meeting #71, R1-124795, Nov. 12-16, 2012, 6 pgs.

NTT DOCOMO, "Search Design for Localized EPDCCH Transmission", 3GPP TSG RAN WG1 Meeting #71, R1-124842, Nov. 12-16, 2012, 5 pgs.

Panasonic, "EPDCCH search space and aggregation levels", 3GPP TSH RAN WG1 Meeting #71, R1-124784, Nov. 12-16, 2012, 8 pgs.

\* cited by examiner

FIG. 16

One EPDCCH candidate

| EREG group #0 | 0 | 4 | 8 | 12 |
| --- | --- | --- | --- | --- |
| EREG group #1 | 1 | 5 | 9 | 13 |
| EREG group #2 | 2 | 6 | 10 | 11 |
| EREG group #3 | 3 | 7 | 14 | 15 |

PRB pair #n0

| 0 | 4 | 8 | 12 |
| --- | --- | --- | --- |
| 1 | 5 | 9 | 13 |
| 2 | 6 | 10 | 11 |
| 3 | 7 | 14 | 15 |

PRB pair #n1

| 0 | 4 | 8 | 12 |
| --- | --- | --- | --- |
| 1 | 5 | 9 | 13 |
| 2 | 6 | 10 | 11 |
| 3 | 7 | 14 | 15 |

PRB pair #n2

| 0 | 4 | 8 | 12 |
| --- | --- | --- | --- |
| 1 | 5 | 9 | 13 |
| 2 | 6 | 10 | 11 |
| 3 | 7 | 14 | 15 |

PRB pair #n3

EPDCCH candidates for distributed ECCE
(Aggregation level = 1, Blocks 4 localized ECCEs)

METHOD FOR TRANSMITTING AND RECEIVING CONTROL INFORMATION AND DEVICE FOR SAME

CROSS REFERENCE TO RELATED APPLICATIONS

This application is the National Phase of PCT International Application No. PCT/KR2013/010503, filed on Nov. 19, 2013, which claims priority under 35 U.S.C. 119(e) to U.S. Provisional Application No. 61/728,202, filed on Nov. 19, 2012, all of which are hereby expressly incorporated by reference into the present application.

TECHNICAL FIELD

The present invention relates to a wireless communication system, and more particularly, to a method of transceiving control information and an apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

One object of the present invention is to provide a method of efficiently transmitting/receiving control information in a wireless communication and an apparatus therefor. Another object of the present invention is to provide a method of efficiently transmitting/receiving a control channel signal and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, a method for enabling a user equipment to receive an enhanced physical downlink channel (EPDCCH) signal in a wireless communication system comprises the steps of receiving a subframe including an EPDCCH set, the EPDCCH set including a plurality of EPDCCH candidates; and monitoring the plurality of EPDCCH candidates in the EPDCCH set in order to receive the EPDCCH signal, wherein indexes of enhanced control channel elements (ECCEs) corresponding to the plurality of EPDCCH candidates are given by the following Equation:

$$L\left\{\left(Y_{p,k} + \left\lfloor \frac{m \cdot N_{ECCE,p,k}}{L \cdot M_p^{(L)}} \right\rfloor + b \right) \bmod \lfloor N_{ECCE,p,k}/L \rfloor \right\} + i \quad \text{Equation}$$

where, L represents an aggregation level, and $Y_k$ represents an offset value for a subframe #k, m represents indexes of the EPDCCH candidates, $N_{ECCE}$ represents the number of ECCEs in the EPDCCH set, b represents a carrier indicator field (CIF) value, i is an integer between 0 and L−1, $\lfloor \ \rfloor$ represents a floor function, and $M_{set}^{(L)}$ represents the number of EPDCCH candidates of which aggregation level is L in the EPDCCH set and is given as an odd number or a prime number of $N_{ECCE}/L$ under predetermined conditions.

In another aspect of the present invention, a user equipment configured to receive an enhanced physical downlink channel (EPDCCH) signal in a wireless communication system comprises a radio frequency (RF) unit; and a processor, wherein the processor is configured to receive a subframe including an EPDCCH set, the EPDCCH set including a plurality of EPDCCH candidates and monitor the plurality of EPDCCH candidates in the EPDCCH set in order to receive the EPDCCH signal, and indexes of enhanced control channel elements (ECCEs) corresponding to the plurality of EPDCCH candidates are given by the following Equation:

$$L\left\{\left(Y_{p,k} + \left\lfloor \frac{m \cdot N_{ECCE,p,k}}{L \cdot M_p^{(L)}} \right\rfloor + b \right) \bmod \lfloor N_{ECCE,p,k}/L \rfloor \right\} + i \quad \text{Equation}$$

where, L represents an aggregation level, and $Y_k$ represents an offset value for a subframe #k, m represents indexes of the EPDCCH candidates, $N_{ECCE}$ represents the number of ECCEs in the EPDCCH set, b represents a carrier indicator field (CIF) value, i is an integer between 0 and L−1, $\lfloor \ \rfloor$ represents a floor function, and $M_{set}^{(L)}$ represents the number of EPDCCH candidates of which aggregation level is L in the EPDCCH set and is given as an odd number or a prime number of $$\frac{N_{ECCE}}{L}$$

under predetermined conditions.

Preferably, if the plurality of EPDCCH sets are configured for the user equipment at the subframe, $M_{set}^{(L)}$ may be given as an odd number or a prime number of $$\frac{N_{ECDE}}{L}$$

in at least one aggregation level of all the aggregation levels.

Preferably, if a localized EPDCCH set and a distributed EPDCCH set are configured for the user equipment at the subframe, $M_{set}^{(L)}$ for the localized EPDCCH set may be given as an odd number or a prime number of $$\frac{N_{ECCE}}{L}$$

in at least one aggregation level of all the aggregation levels.

Preferably, if the EPDCCH sets are localized EPDCCH sets, $M_{set}^{(L)}$ may be given as an odd number or a prime number of $$\frac{N_{ECCE}}{L}$$

in at least one aggregation level of all the aggregation levels.

Preferably, if the ECCE is a localized ECCE (L-ECCE), $M_{set}^{(L)}$ may be given as an odd number or a prime number of $$\frac{N_{ECCE}}{L}$$

in at least one aggregation level of all the aggregation levels.

Advantageous Effects

According to the present invention, control information can be efficiently transmitted and received in a wireless communication system. And, a control channel signal can be efficiently transmitted and received.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 16 is a diagram illustrating EPDCCH candidate on D-ECCE (Distributed ECCE);

BEST MODE FOR CARRYING OUT THE INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and employs OFDMA in downlink and SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help the present invention to be understood. The specific terminologies can be modified into a different form within a range not deviating from a technical idea of the present invention.

Figure 1:
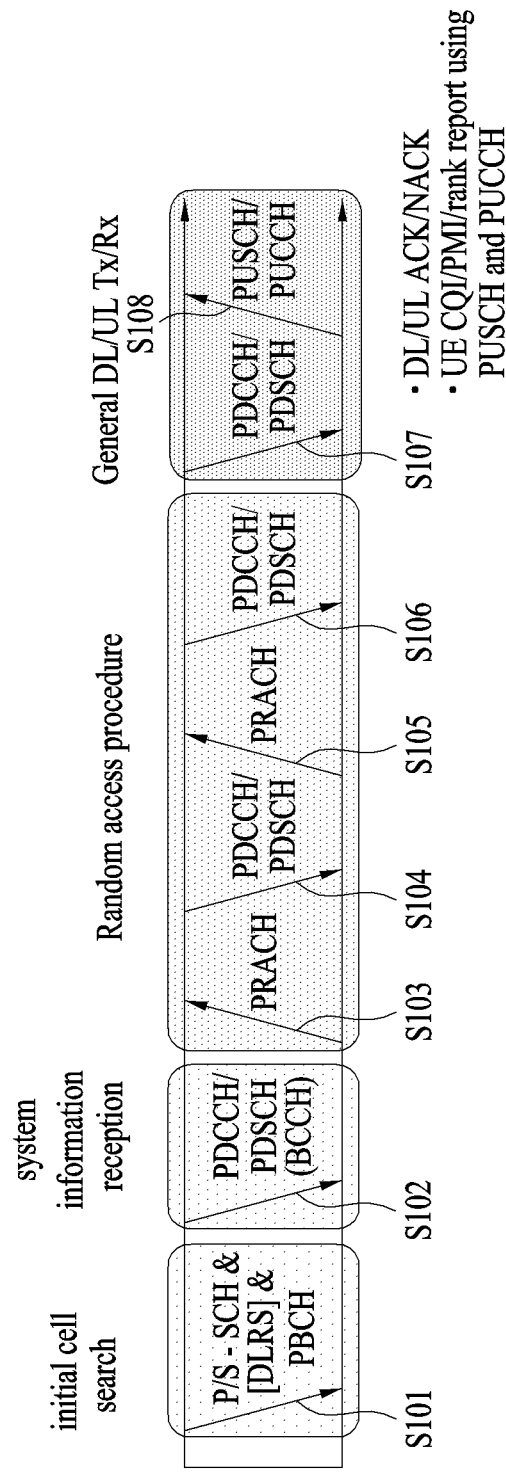
FIG. 1 is a diagram for explaining an example of physical channels used for LTE (-A) system and a general signal transmission method using the same.

FIG. 1 is a diagram for explaining an example of physical channels used for LTE (-A) system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Subsequently, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above-mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure.

Figure 2:
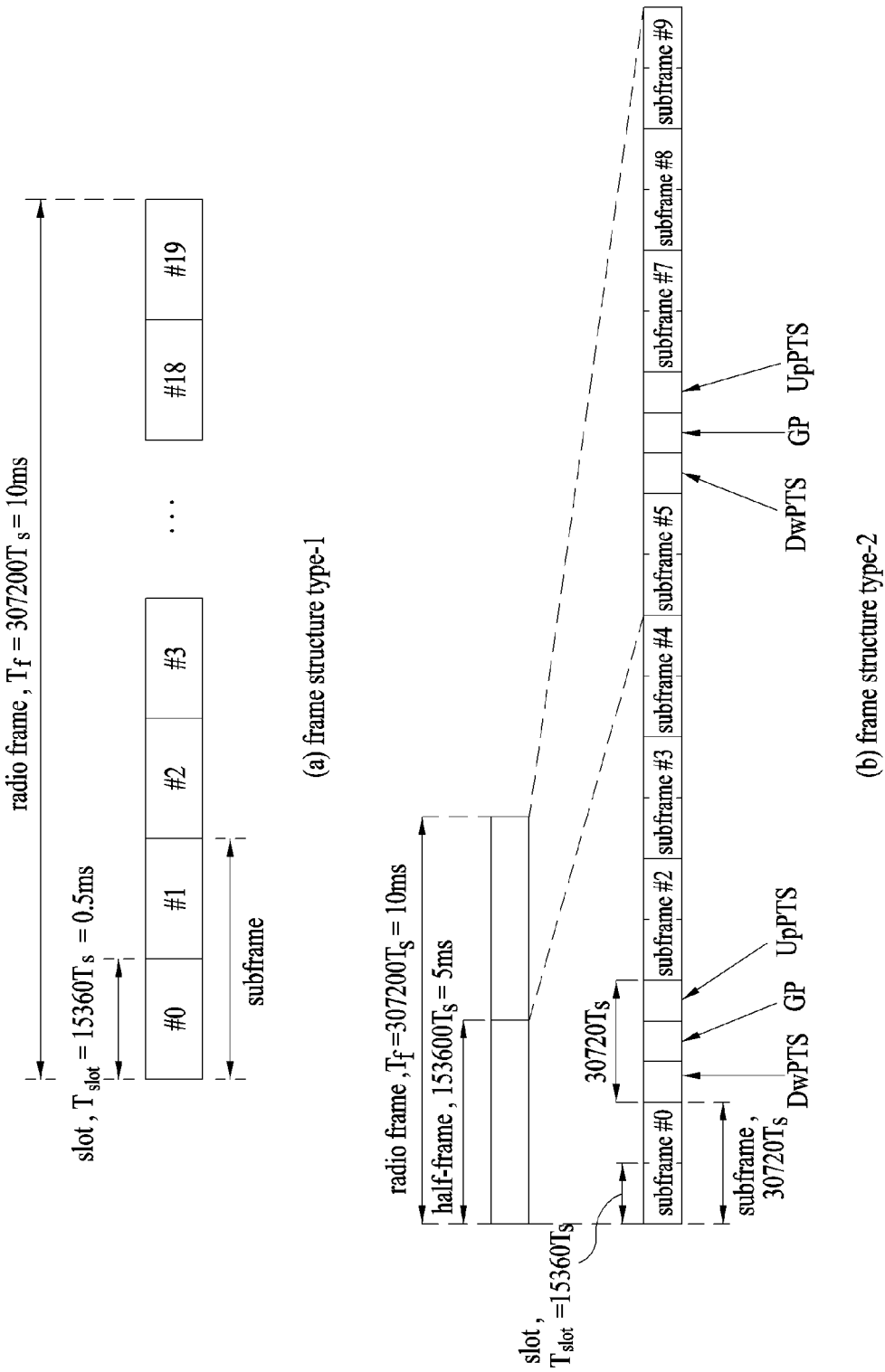
FIG. 2 is a diagram for explaining an example of a structure of a radio frame in LTE (-A) system.

FIG. 2 is a diagram for explaining an example of a structure of a radio frame in LTE (-A) system. Referring to FIG. 2, UL/DL (uplink/downlink) data packet transmission is performed by a unit of subframe. And, one subframe is defined as a time interval including a plurality of symbols. In the LTE (-A) standard, a type-1 radio frame structure applicable to FDD (frequency division duplex) and a type-2 radio frame structure applicable to TDD (time division duplex) are supported.

FIG. 2(a) is a diagram for an example of a structure of a type 1 radio frame. A DL (downlink) radio frame includes 10 subframes. Each of the subframes includes 2 slots in time domain. For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE (-A) system uses OFDM in downlink, OFDM symbol is provided to indicate one symbol period. The OFDM symbol may be named SC-FDMA symbol or symbol period. Resource block (RB) is a resource allocation unit and may include a plurality of contiguous subcarriers in one slot.

The number of OFDM symbols included in one slot may vary in accordance with a configuration of a CP (cyclic prefix configuration). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for a structure of a type 2 radio frame. The type-2 radio frame includes 2 half frames. Each of the half frame includes 4 (5) normal subframes and 1 (0) special subframe. The normal subframe may be used for UL or DL according to an uplink-downlink configuration. Each of subframes includes 2 slots.

Figure 3:
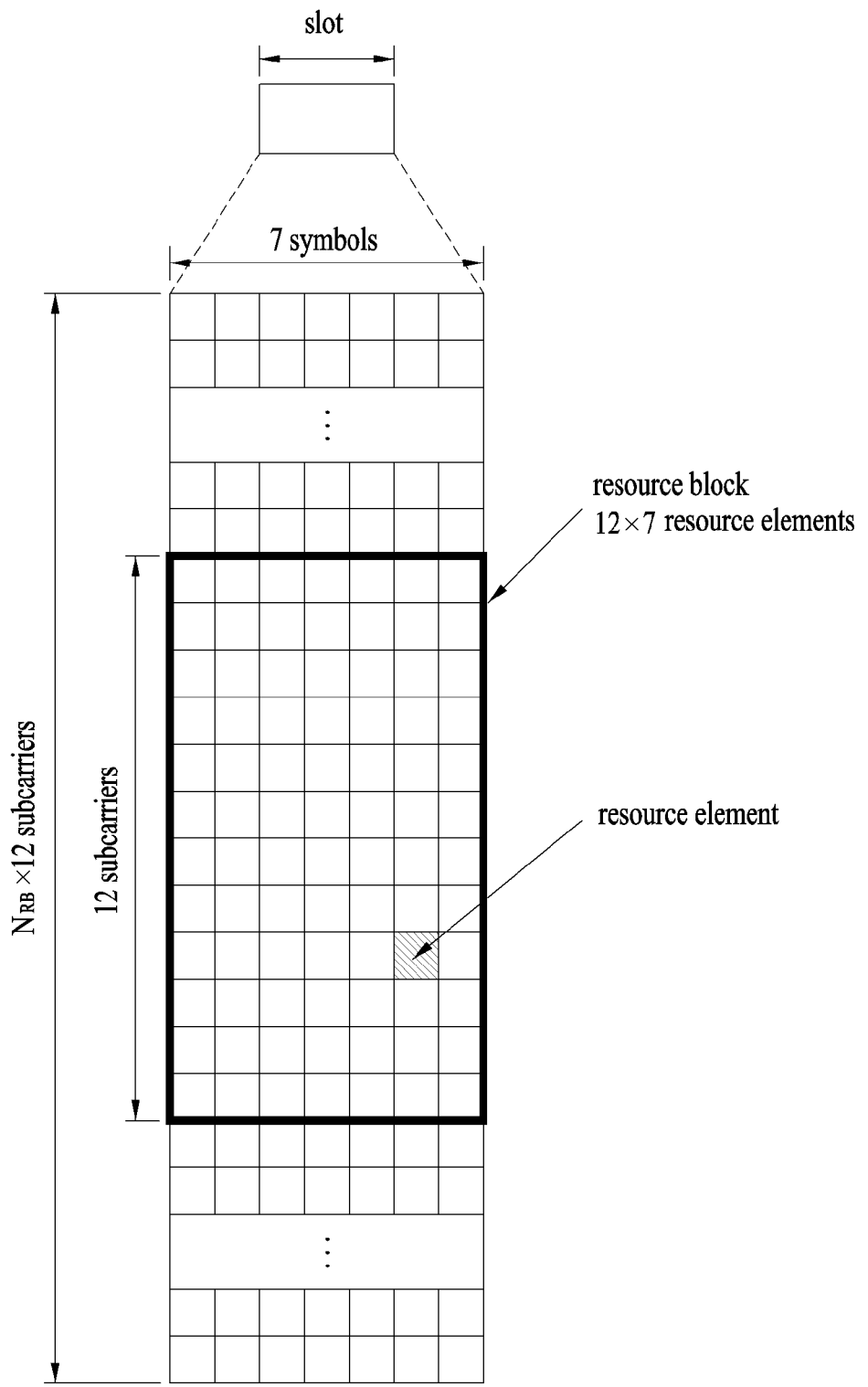
FIG. 3 is a diagram for an example of a resource grid for a downlink slot.

FIG. 3 is a diagram for an example of a resource grid for a downlink slot.

Referring to FIG. 3, one downlink (DL) slot may include a plurality of OFDM symbols in time domain. In particular, one DL slot includes 7 (6) OFDM symbols and a plurality of resource blocks (RBs). One resource block (RB) can include 12 subcarriers in frequency domain. Each element on a resource grid is called a resource element (hereinafter abbreviated RE). One RB includes 12×7(6) REs. The number NRB of resource blocks included in a DL slot may depend on a DL transmission bandwidth. And, a structure of an uplink (UL) slot may be identical to a structure of the DL slot, while an OFDM symbol is replaced with an SC-FDMA symbol.

Figure 4:
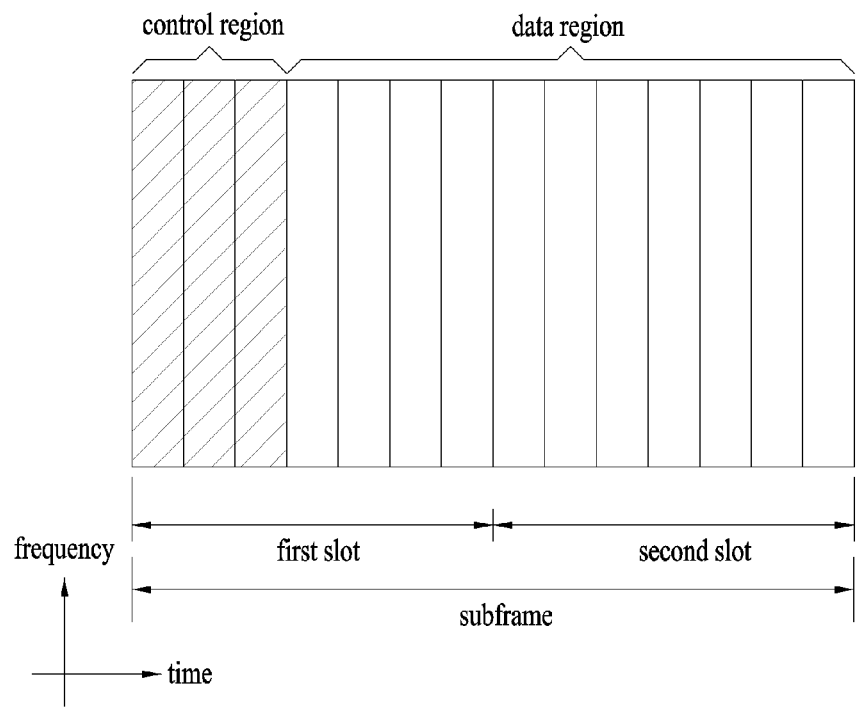
FIG. 4 is a diagram for an example of a structure of a downlink subframe.

FIG. 4 is a diagram for an example of a structure of a downlink subframe.

Referring to FIG. 4, maximum 3 (4) OFDM symbols situated in a head part of a first slot of one subframe correspond to a control region to which control channels are allocated. The rest of OFDM symbols correspond to a data region to which PDSCH (physical downlink shared channel) is assigned. Examples of DL control channels used by LTE (-A) may include PCFICH (Physical Control Format Indicator Channel), PDCCH (Physical Downlink Control Channel), PHICH (Physical hybrid ARQ indicator Channel) and the like.

The PCFICH is transmitted in a first OFDM symbol of a subframe and carries information on the number of OFDM symbols used for a transmission of a control channel within the subframe. The PCFICH includes 4 REGs (resource element groups). Each of the REGs is uniformly distributed to a control region based on a cell ID. The PCFICH indicates a value among 1 to 3 (or 2 to 4) and is modulated by QPSK (quadrature phase shift keying). PHICH carries a HARQ ACK/NACK signal in response to uplink transmission. The PHICH is assigned to remaining REGs where a CRS (cell-specific reference signal) and PCFICH are excluded from one or more OFDM symbols configured by PHICH duration. The PHICH is allocated to three REGs distributed on a frequency domain in a maximum range.

PDCCH is assigned to first n number of OFDM symbols of a subframe (hereinafter called a control region). In this case, the n corresponds to an integer equal to or greater than 1. The n is indicated by PCFICH. Control information carried on PDCCH may be called downlink control information (DCI). A DCI format is defined by formats of 0, 3, 3A, and 4 for uplink and the DCI format is defined by formats of 1, 1A, 1B, 1C, 1D, 2, 2A, 2B, 2C and the like for downlink. For instance, the DCI format may be able to selectively include such information as a hopping flag, RB allocation, an MCS (modulation coding scheme), an RV (redundancy version), an NDI (new data indicator), a TPC (transmit power control), a cyclic shift DM-RS (demodulation reference signal), a CSI (channel state information) request, a HARQ process number, a TPMI (transmitted precoding matrix indicator), PMI (precoding matrix indicator) confirmation and the like according to a usage.

PDCCH is able to carry a transmission format of DL-SCH (downlink shared channel) and resource allocation information, a transmission format of UL-SCH (uplink shared channel) and resource allocation information, paging information on PCH (paging channel), system information on DL-SCH, resource allocation information of a higher layer control message such as a random access response transmitted on PDSCH, a transmit power control command set for individual user equipments within a user equipment group, a transmit power control command, indication information activating VoIP (voice over IP) and the like. A base station determines a PDCCH format in accordance with DCI to be transmitted to a user equipment and attaches a CRC (cyclic redundancy check) to control information. The CRC is masked with a unique identifier (RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, the CRC can be masked with a system information identifier (e.g., SI-RNTI (system information-RNTI). If PDCCH is used for a random access response, the CRC can be masked with RA-RNTI (random access-RNTI).

In general, a plurality of PDCCHs can be transmitted within a subframe. Each of the PDCCHs is transmitted using one or more CCEs (control channel elements) and each CCE includes 9 REGs. An REG includes 4 REs. A CCE is a logical allocation unit used for providing a coding rate based on radio channel status to PDCCH. A format of PDCCH and the number of PDCCH are determined according to the number of CCE (CCE aggregation level).

Table 1 in the following shows the number of CCE according to a PDCCH format, the number of REGs and the number of PDCCH bits.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are used in a manner of being numbered contiguously. In order to simplify a decoding process, a PDCCH format including n CCEs may start with CCE having a number equal to the multiple of n. The number of CCEs used for transmitting a specific PDCCH is determined by a base station in accordance with a channel condition. For instance, a single CCE may be sufficient for a PDCCH provided for a user equipment having a good DL channel (e.g., a case that the user equipment is located in the vicinity of a base station). On the other hand, in case of a user equipment having a poor channel (e.g., a case that the user equipment is located at a cell boundary), 8 CCEs can be used to obtain sufficient robustness. Besides, a power level of PDCCH may be adjusted according to the channel condition.

LTE (-A) defines a CCE position of a limited set where a PDCCH is able to be positioned for each of user equipments. The CCE position of a limited set (a limited CCE set or a limited PDCCH candidate set), which is necessary to be monitored by a user equipment to search for PDCCH of the user equipment, may be called a search space (SS). In this case, the monitoring performed by the user equipment includes decoding of each PDCCH candidate (blind decoding). In LTE (-A) system, a UE-specific search space (USS) and a common search space (CSS) are separately defined. The USS may be individually set for each of user equipments and the CSS is identically set to user equipments. The USS and the CSS can be overlapped with each other. A start point of the USS is UE-specifically hopping in each subframe. A size of the search space may vary according to a PDCCH format.

Table 2 in the following shows a size of CSS and a size of USS.

TABLE 2

| PDCCH format | Number of CCEs (n) | Number of PDCCH candidates in Common | Number of PDCCH candidates in UE-specific |
|---|---|---|---|
| 0 | 1 | — | 6 |
| 1 | 2 | — | 6 |
| 2 | 4 | 4 | 2 |
| 3 | 8 | 2 | 2 |

Supposing that the number of CCEs at a subframe #k is $N_{CCE,k}$, CCE may be indexed to $0 \sim N_{CCE,k}-1$. In this case, $CCE(n_{CCE})$ corresponding to a PDCCH candidate #m at a search space $S_k^{(L)}$ for an aggregation level L at the subframe #k is given as follows. For convenience, the Equation 1 will be referred to as a hashing function for the search space.

$$L \cdot \left\{ (Y_k + m) \bmod \left\lfloor \frac{N_{CCE,k}}{L} \right\rfloor \right\} + i \qquad \text{[Equation 1]}$$

In this case, $Y_k$ is an offset used to designate a start position of $S_k^{(L)}$. A value of $Y_k$ may be varied depending on subframes, and may be given UE-specifically by using UE identifier. Also, i is an integer of $i=0 \sim L-1$.

In order to make a calculation load of a user equipment due to a blind decoding (BD) attempt count to be under control, a user equipment does not search for all defined DCI formats at the same time. In general, the user equipment always searches for a DCI format 0 and a DCI format 1A in the USS. The DCI format 0 and the DCI format 1A are equal to each other in size and may be identified by a flag included in a message. And, the user equipment may be requested to receive an additional format (e.g., format 1, 1B, or 2 according to a PDSCH transmission mode set by a base station). The user equipment searches for a DCI format 1A and a DCI format 1C in the CSS. Moreover, the user equipment may be configured to search for a DCI format 3 or a DCI format 3A. In this case, the DCI format 3 and 3A may have a size identical to a size of the DCI format 0 and 1A. The user equipment may be able to identify a DCI format by scrambling a CRC using a (common) identifier different from each other, rather than a UE-specific identifier. PDSCH transmission scheme according to a transmission mode (TM) and information content of DCI formats are described in following.

Transmission Mode (TM)
  Transmission mode 1: transmission from a single antenna port of a base station
  Transmission mode 2: transmit diversity
  Transmission mode 3: open-loop spatial multiplexing
  Transmission mode 4: closed-loop spatial multiplexing
  Transmission mode 5: multi-user MIMO (multiple input multiple output)
  Transmission mode 6: closed-loop rank-1 precoding
  Transmission mode 7: single antenna port (port 5) transmission
  Transmission mode 8: double layers transmission (port 7 and 8) or single antenna port (port 7 or 8) transmission Transmission mode 9 to 10: maximum 8 layers transmission (port 7 to 14) or single antenna port (port 7 or 8) transmission DCI Format Format 0: resource grants for PUSCH transmissions Format 1: resource assignments for single codeword PDSCH transmissions (transmission modes 1, 2 and 7)

Format 1A: compact signaling of resource assignments for single codeword PDSCH (all modes)

Format 1B: compact resource assignments for PDSCH using rank-1 closed loop precoding (mode 6)

Format 1C: very compact resource assignments for PDSCH (e.g. paging/broadcast system information)

Format 1D: compact resource assignments for PDSCH using multi-user MIMO (mode 5)

Format 2: resource assignments for PDSCH for closed-loop MIMO operation (mode 4)

Format 2A: resource assignments for PDSCH for open-loop MIMO operation (mode 3)

Format 3/3A: power control commands for PUCCH and PUSCH with 2-bit/1-bit power adjustment value Format 4: resource assignments for PUSCH transmission in cell to which multi-antenna port transmission mode is set A DCI format can be classified into a TM-dedicated format and a TM-common format. The TM-dedicated format corresponds to a DCI format set to a corresponding TM only. The TM-common format corresponds to a DCI format commonly set to all TMs. For instance, in case of the TM 8, the DCI format 2B may correspond to the TM-dedicated DCI format. In case of the TM 9, the DCI format 2C may correspond to the TM-dedicated DCI format. In case of the TM 10, the DCI format 2D may correspond to the TM-dedicated DCI format. And, the DCI format 1A may correspond to the TM-common DCI format.

Figure 5:
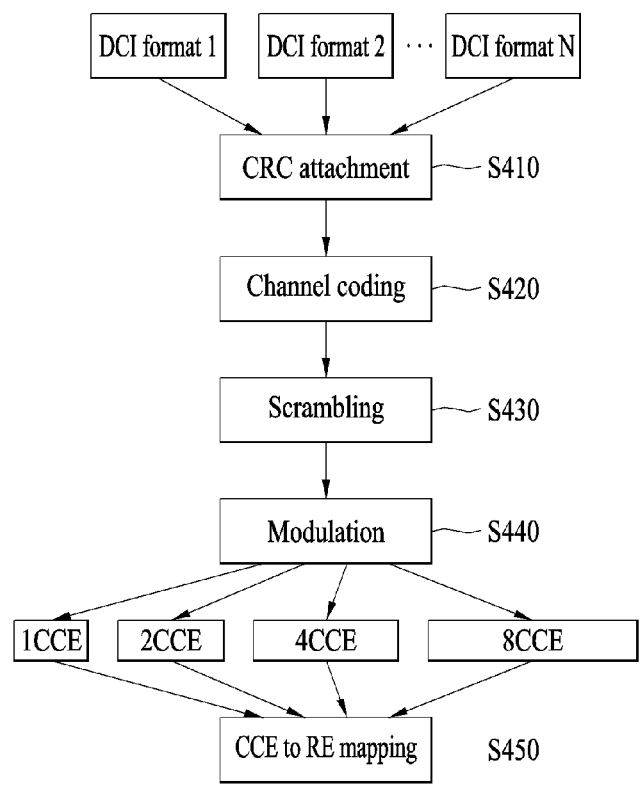
FIG. 5 shows an example of configuring PDCCH configured by a transmission end.

FIG. 5 shows an example of configuring PDCCH configured by a transmission end (e.g., base station).

Referring to FIG. 5, a base station generates control information according to a DCI format. The base station can select a single DCI format from a plurality of DCI formats (DCI format 1, 2, . . . , N) according to control information to be transmitted to a user equipment. In the step S410, a CRC is attached to the control information, which is generated according to each DCI format, to detect an error. The CRC is masked with an identifier (e.g., RNTI (radio network temporary identifier)) according to an owner of PDCCH or a usage. In other word, PDCCH is CRC-scrambled by an identifier (e.g., RNTI).

Table 3 in the following shows an example of identifiers masking PDCCH.

TABLE 3

| Type | Identifier | Description |
| --- | --- | --- |
| UE-specific | C-RNTI, TC-RNTI, SPS C-RNTI | used for a unique UE identification |
| Common | P-RNTI | used for paging message |
| | SI-RNTI | used for system information |
| | RA-RNTI | used for random access response |

If a C-RNTI, a TC-RNTI (temporary C-RNTI), or an SPS C-RNTI (semi-persistent scheduling C-RNTI) is used, PDCCH carries control information for a specific user equipment. If the rest of RNTI is used, the PDCCH carries common control information by which all user equipments within a cell receive. In the step S420, the base station generates coded control information by performing a channel coding on the CRC attached control information. Transmission rate matching can be performed on the coded control information according to an assigned CCE aggregation level. In the step S430, the base station applies scrambling to the coded control information. The scrambling is applied to multiplexed control information. Specifically, a method of performing the scrambling is described in the following.

First of all, coded control information (e.g., coded DCI (including masked CRC)) to be transmitted on each control channel (i.e., PDCCH) is defined by a bit sequence $b^{(i)}(0), \ldots, b^{(i)}(M_{bit}^{(i)}-1)$. In this case, $M_{bit}^{(i)}$ indicates the number of bits transmitted on PDCCH #i of a subframe. In this case, multiplexed control information is given as follows.

$b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ In this case, $n_{PDCCH}$ corresponds to the number of PDCCHs transmitted in a subframe.

The bit sequence $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ is scrambled by a cell-specific sequence and the scrambled bit sequence is converted into $\tilde{b}(0), \ldots, \tilde{b}(M_{tot}-1)$. In this case, $M_{tot}$ indicates the number (or length) of bits of the multiplexed control information or the number (or length) of bits of a scrambling bit sequence.

Scrambling can be performed according to equation in the following.

$$\tilde{b}(i) = (b(i) + c(i)) \bmod 2 \qquad \text{[Equation 2]}$$

In this case, i ranges from 0 to $M_{tot}$, mod indicates Modulo calculation, and a scrambling sequence c(i) can be obtained by an equation in the following.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \qquad \text{[Equation 3]}$$

In this case, n ranges from 0 to $M_{PN}-1$, the $M_{PN}$ corresponds to a sequence length, $N_c$ corresponds to 1600, $x_1(0)=1, x_1(n)=0, n=1, 2, \ldots, 30$, and $c_{init} = \sum_{i=0}^{30} x_2(i) \cdot 2^i$.

$c_{init}$ corresponds to an initialization value used for generating a scrambling sequence. The $c_{init}$ is given by $\lfloor n_s/2 \rfloor 2^9 + N_{ID}^{cell}$. In this case, $n_s$ corresponds to a slot number in a radio frame, $N_{ID}^{cell}$ corresponds to a physical cell identifier, and $\lfloor \: \rfloor$ corresponds to a flooring function. A scrambling sequence generator according to equation 2 can be initialized to the $c_{init}$ in every subframe.

In the step S440, modulation symbols can be generated by modulating the scrambled control information. A CCE aggregation level of modulation symbols constructing a single PDCCH may correspond to one of 1, 2, 4 and 8. In the step S450, the modulation symbols are mapped to a resource element (RE) (CCE to RE mapping).

Figure 6:
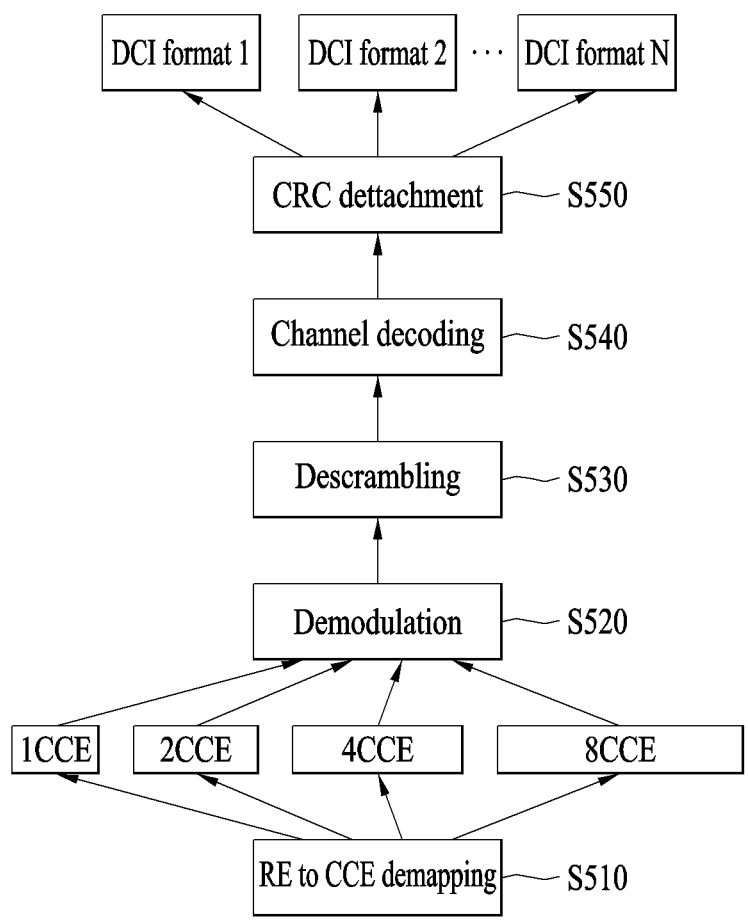
FIG. 6 is a flowchart for an example of processing PDCCH processed by a reception end.

FIG. 6 is a flowchart for an example of processing PDCCH processed by a reception end (e.g., user equipment).

Referring to FIG. 6, in the step S510, a user equipment de-maps a physical resource element to a CCE (CCE to RE de-mapping). In the step S520, since the user equipment does not know a CCE aggregation level necessary for receiving PDCCH, the user equipment performs demodulation on each of CCE aggregation levels. Rate de-matching can be performed for demodulated control information. In this case, since the user equipment does not know a DCI format (or DCI payload size) of control information to be received, the user equipment can perform rate de-matching for each of DCI formats (or DCI payload size).

In the step S530, the user equipment performs de-scrambling on demodulated control information $\tilde{b}(i)$ and generates descrambled control information b(i). Descrambling can be performed according to an equation in the following. The $\tilde{b}(i)$ and the b(i) are defined in the foregoing description.

$$b(i)=(\tilde{b}(i)+c(i)) \bmod 2 \qquad \text{[Equation 4]}$$

In this case, a scrambling sequence c(i) can be obtained using equation 3.

In the step S540, the user equipment performs channel decoding on the descrambled control information b(i) according to a code-rate and detects whether an error occurs by checking a CRC. In order to check whether an error occurs using the CRC, the user equipment descrambles (or de-masks) the CRC using identification information shown in Table 3. If an error does not occur, it indicates that the user equipment has detected PDCCH of the user equipment. If an error occurs, the user equipment continuously performs blind decoding on a different CCE aggregation level or a different DCI format (or DCI payload size). In the step S550, having detected the PDCCH of the user equipment, the user equipment eliminates a CRC from the decoded control information and obtains control information.

Figure 7:
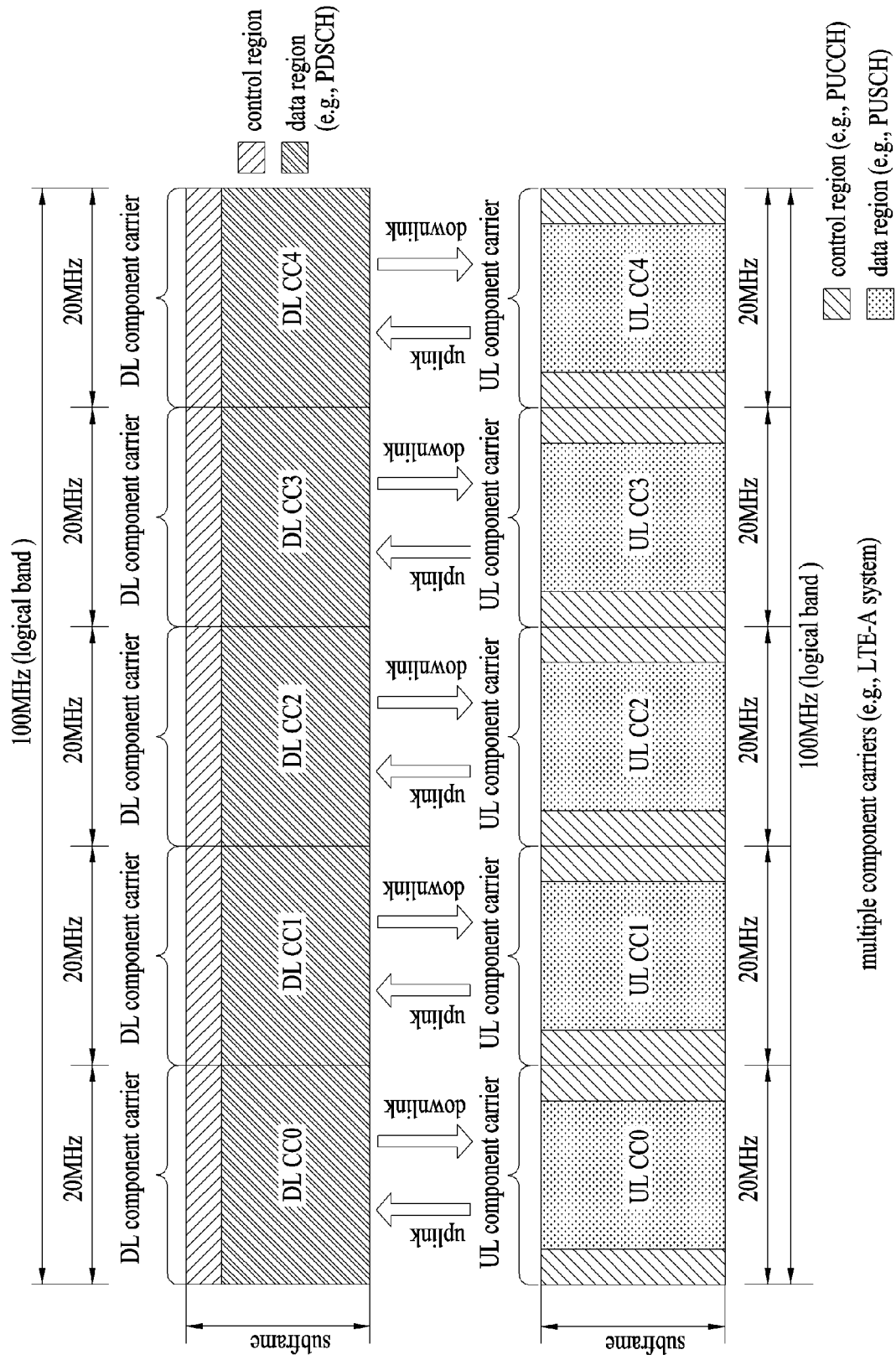
FIG. 7 is a diagram for an example of a carrier aggregation (CA) communication system.

FIG. 7 is a diagram for an example of a carrier aggregation (CA) communication system.

Referring to FIG. 7, a wider UL/DL bandwidth can be supported in a manner of aggregating a plurality of UL/DL component carriers (CC). Each of the component carriers may be adjacent to each other or non-adjacent to each other. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC. As one example, in case that a cross-carrier scheduling (or a cross-CC scheduling) is applied, PDCCH for DL assignment is transmitted on a DL CC #0 and a corresponding PDSCH can be transmitted on a DL CC #2. The terminology 'component carrier' can be replaced by such an equivalent terminology as a carrier, a cell, and the like.

For a cross-CC scheduling, a CIF (carrier indicator field) is used. A configuration informing whether a CIF exists or not within a PDCCH can be semi-statically and user-specifically (or user group-specifically) enabled via a higher layer signaling (e.g., RRC signaling). Basics of PDCCH transmission can be summarized as follows.

CIF disabled: PDCCH on DL CC assigns a PDSCH resource on the same DL CC or a PUSCH resource on a singly linked UL CC.
  No CIF
CIF enabled: PDCCH on DL CC assigns a PDSCH or PUSCH resource to one of multiply aggregated DL/UL CCs using a CIF.
  LTE DCI format expanded to have a CIF
    CIF (configured CIF) is stationary x-bit field (e.g., x=3)
    CIF (configured CIF) position is stationary irrespective of a DCI format size In case that a CIF exists within a PDCCH, a base station may be able to assign a monitoring DL CC (set) to reduce BD complexity of a user equipment side. For a scheduling of PDSCH/PUSCH, a user equipment may be able to perform a detection/decoding of the PDCCH on a corresponding DL CC only. In particular, the base station may be able to transmit the PDCCH via the monitoring DL CC only. The monitoring DL CC set may be configured UE-specifically, UE group-specifically or cell-specifically.

Figure 8:
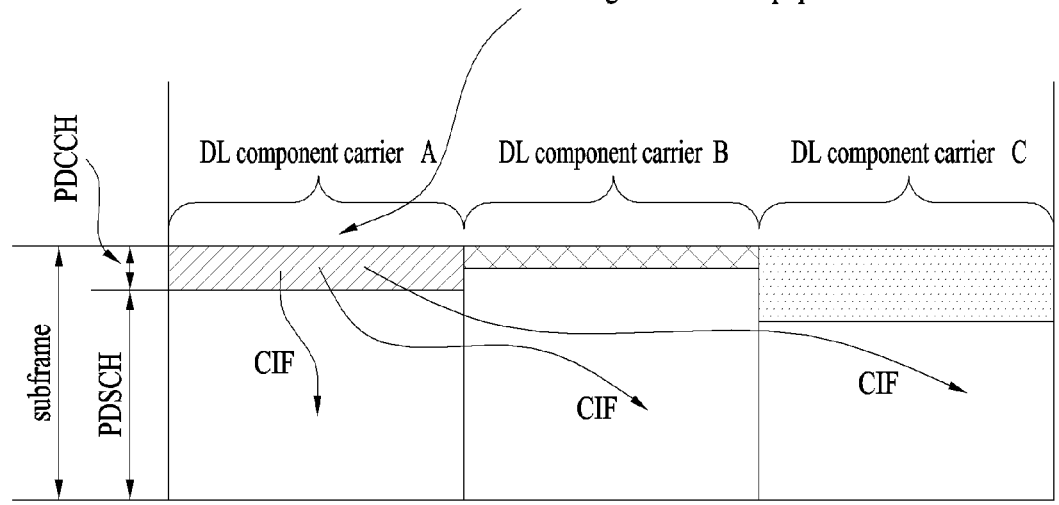
FIG. 8 is a diagram for an example of a cross-carrier scheduling.

FIG. 8 is a diagram for an example of a case that 3 DL CCs are aggregated and a DL CC A is configured as a monitoring DL CC. If a CIF is disabled, each of DL CCs may be able to transmit PDCCH, which schedules PDSCH of each of the DL CCs, without a CIF according to an LTE PDCCH rule. On the other hand, if the CIF is enabled by a higher layer signaling, only the DL CC A may be able to transmit the PDCCH, which schedules the PDSCH of a different DL CC as well as the PDSCH of the DL CC A using the CIF. PDCCH is not transmitted on a DL CC B and a DL CC C, which are not configured as a monitoring DL CC. In this case, such a terminology as a monitoring DL CC can be replaced by such an equivalent terminology as a monitoring carrier, a monitoring cell, a scheduling carrier, a scheduling cell, a serving carrier, a serving cell, and the like. A DL CC carrying a PDSCH corresponding to a PDCCH and a UL CC carrying a PUSCH corresponding to a PDCCH can be called a scheduled carrier, a scheduled cell or the like.

As mentioned earlier in FIG. 4, an FDD DL carrier and a TDD DL subframes use first n OFDM symbols of a subframe to transmit PDCCH, PHICH, PCFICH or the like, which is a physical channel used for transmitting various control information and use the rest of OFDM symbols to transmit PDSCH. The number of symbols used for transmitting a control channel in each subframe is delivered to a user equipment dynamically via such a physical channel as PCFICH and the like or semi-statically via an RRC signaling. The n value can be set from 1 symbol to maximum 4 symbols according to subframe property and system property (FDD/TDD, system bandwidth, etc.). Meanwhile, PDCCH, which is a physical channel used for transmitting DL/UL scheduling and various kinds of control information, is transmitted via a limited OFDM symbol in a legacy LTE system. Hence, an enhanced PDCCH (EPDCCH), which is multiplexed with PDSCH more freely in a manner of using a FDM scheme, is introducing.

Figure 9:
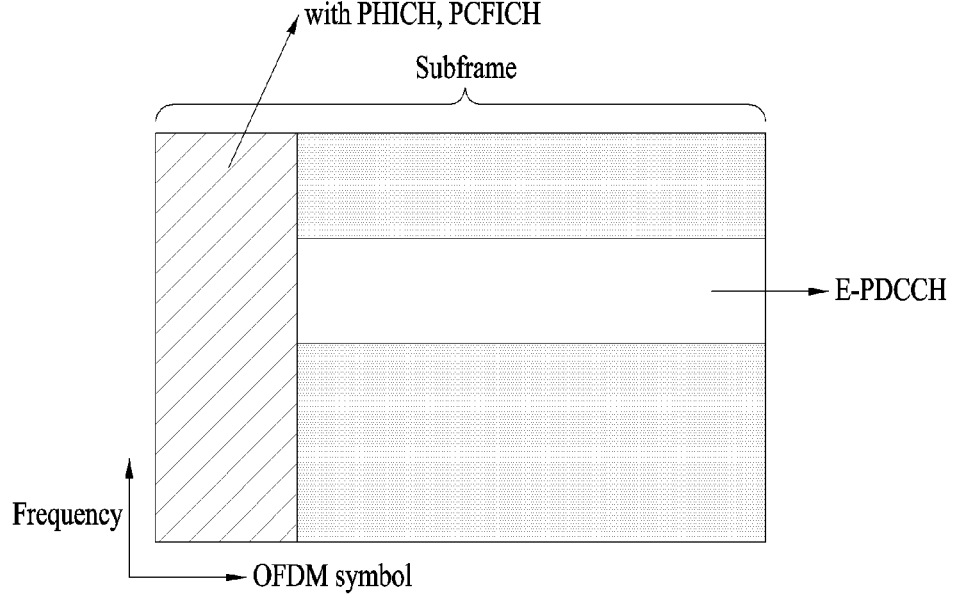
FIG. 9 is a diagram for an example of assigning EPDCCH (enhanced PDCCH) to a data region of a subframe.

FIG. 9 is a diagram for an example of assigning EPDCCH (enhanced PDCCH) to a data region of a subframe.

Referring to FIG. 9, PDCCH (for clarity, a legacy PDCCH (L-PDCCH))) according to a legacy LTE/LTE-A system can be assigned to a control region (refer to FIG. 4) of a subframe. An L-PDCCH region in the drawing means a region to which the legacy PDCCH is able to be assigned thereto. According to the context, the L-PDCCH region may mean a control region, a control channel resource region (i.e., CCE resource) capable of practically being assigned the PDCCH within the control region, or a PDCCH search space. Meanwhile, PDCCH can be additionally assigned to a data region (e.g., a resource region for PDSCH, refer to FIG. 4). The PDCCH assigned to the data region is called an EPDCCH. As shown in the drawing, by additionally obtaining a control channel resource via the EPDCCH, a scheduling limitation due to a limited control channel resource of the L-PDCCH region can be reduced. In the data region, EPDCCH and PDSCH are multiplexed using FDM scheme.

In more detail, the EPDCCH may be detected/demodulated based on a DMRS (Demodulation Reference Signal). The EPDCCH is transmitted to a PRB (Physical Resource Block) pair on a time axis. A resource (for example, PRB set) served by a higher layer (for example, RRC layer) for EPDCCH transmission will be referred to as an EPDCCH set (or EPDCCH-PRB-set). One or more EPDCCH sets may be configured for each user equipment or cell. If carrier aggregation technique is used, the EPDCCH set may be configured independently per CC for all or some of CCs. Each EPDCCH set may reserve a plurality of PRB pairs (for example, 2, 4, 8). A plurality of EPDCCH sets may be overlapped with one another. Similarly to L-PDCCH, a basic channel resource will be defined even in case of the EPDCCH, and E-PDCCH transmission resource may be allocated in a unit of multiple unit (aggregation level) of the basis channel resource, whereby link adaptation may be performed. For example, if a channel status becomes poor, more basic control channel resources may be used for EPDCCH transmission. The basic control channel resource used for EPDCCH transmission may be referred to as ECCE (Enhanced CCE). The EPDCCH of Aggregation level L is transmitted through L number of ECCEs. The ECCE may include a plurality of EREGs (Enhanced Resource Element Groups).

If EPDCCH-based scheduling is configured, it is able to designate a subframe in which EPDCCH transmission/detection is to be performed. EPDCCH can be configured in a USS only. A user equipment attempts to detect DCI for an L-PDCCH CSS and an EPDCCH USS only in a subframe (hereinafter EPDCCH subframe) in which E-PDCCH transmission is permitted. The user equipment attempts to detect DCI for the L-PDCCH CSS and an L-PDCCH USS in a subframe (i.e., non-EPDCCH subframe) in which EPDCCH transmission is not permitted.

Similar to L-PDCCH, EPDCCH carries DCI. For instance, EPDCCH is able to carry DL scheduling information and UL scheduling information. An EPDCCH/PDSCH process and an E-PDCCH/PUSCH process are identical or similar to what is mentioned earlier with reference to the step S107 and the step S108 of FIG. 1. In particular, a user equipment receives EPDCCH and may be then able to receive data/control information via PDSCH corresponding to the received EPDCCH. And, the user equipment receives EPDCCH and may be then able to transmit data/control information via PUSCH corresponding to the received EPDCCH. Meanwhile, according to legacy LTE, a PDCCH candidate region (hereinafter PDCCH search space) is reserved in advance in a control region and PDCCH of a specific UE is transmitted to a partial region of the PDCCH search space. Hence, the UE can obtain PDCCH of the UE in the PDCCH search space via blind decoding. Similarly, EPDCCH can also be transmitted over a part or all of resources reserved in advance.

Figure 10:
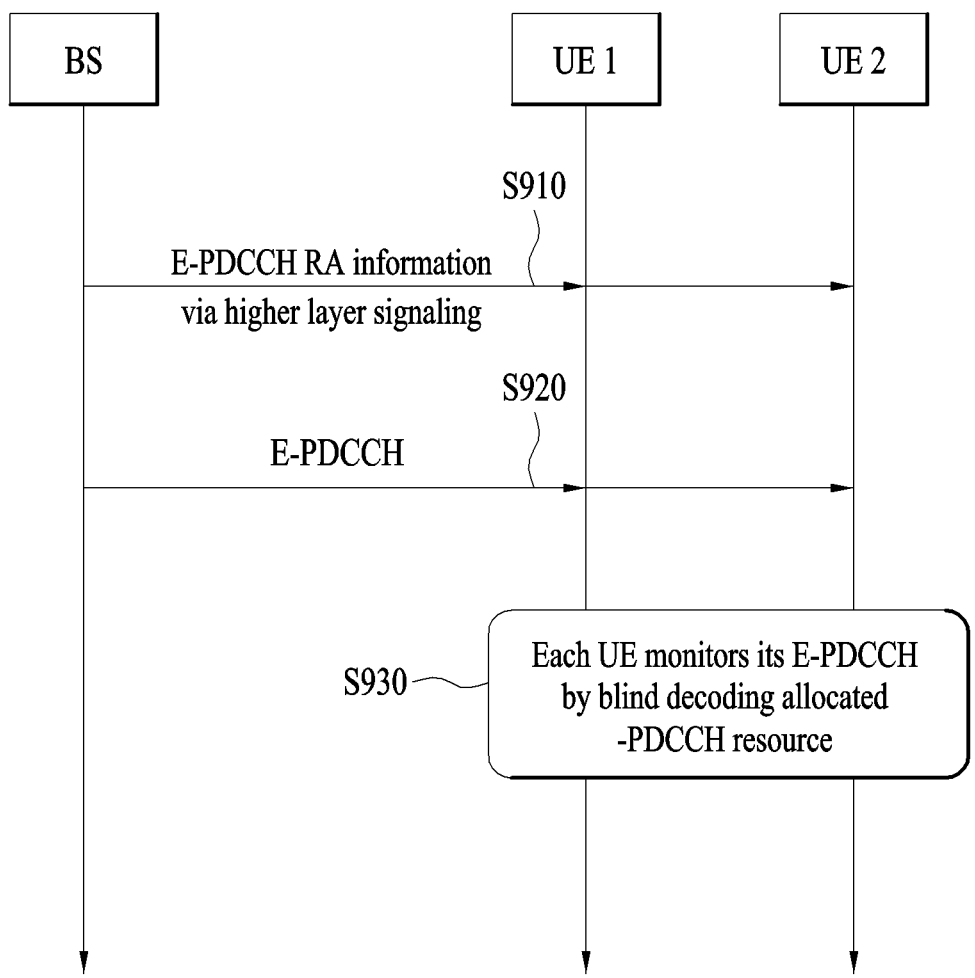
FIG. 10 is a flowchart for an example of resource allocation for EPDCCH and an PDSCH reception process.

FIG. 10 is a flowchart for an example of resource allocation for EPDCCH and an EPDCCH reception process.

Referring to FIG. 10, a base station transmits EPDCCH resource allocation (RA) information to a user equipment [S910]. The EPDCCH RA information may include RB (or VRB (virtual resource block)) assignment information. The RB assignment information can be provided in an RB unit or an RBG (resource block group) unit. An RBG includes 2 or more contiguous RBs. The EPDCCH RA information can be transmitted using a higher layer (e.g., RRC) signaling. In this case, the E-PDCCH RA information is used to reserve an EPDCCH resource (region) (i.e., EPDCCH set) in advance. Subsequently, the base station transmits the EPDCCH to the user equipment [S920]. The EPDCCH can be transmitted within a part or a whole of the region of the EPDCCH resource (e.g., M RBs) reserved in the step S910. Hence, the user equipment monitors a resource (region) (hereinafter, EPDCCH search space) to which the EPDCCH is able to be transmitted thereto [S930]. The EPDCCH search space can be provided as a part of the RB set assigned in the step S910. In this case, monitoring may include blind decoding a plurality of EPDCCH candidates in the search space. The blind decoding can be performed using a scrambling sequence applied to the EPDCCH.

Figure 11:
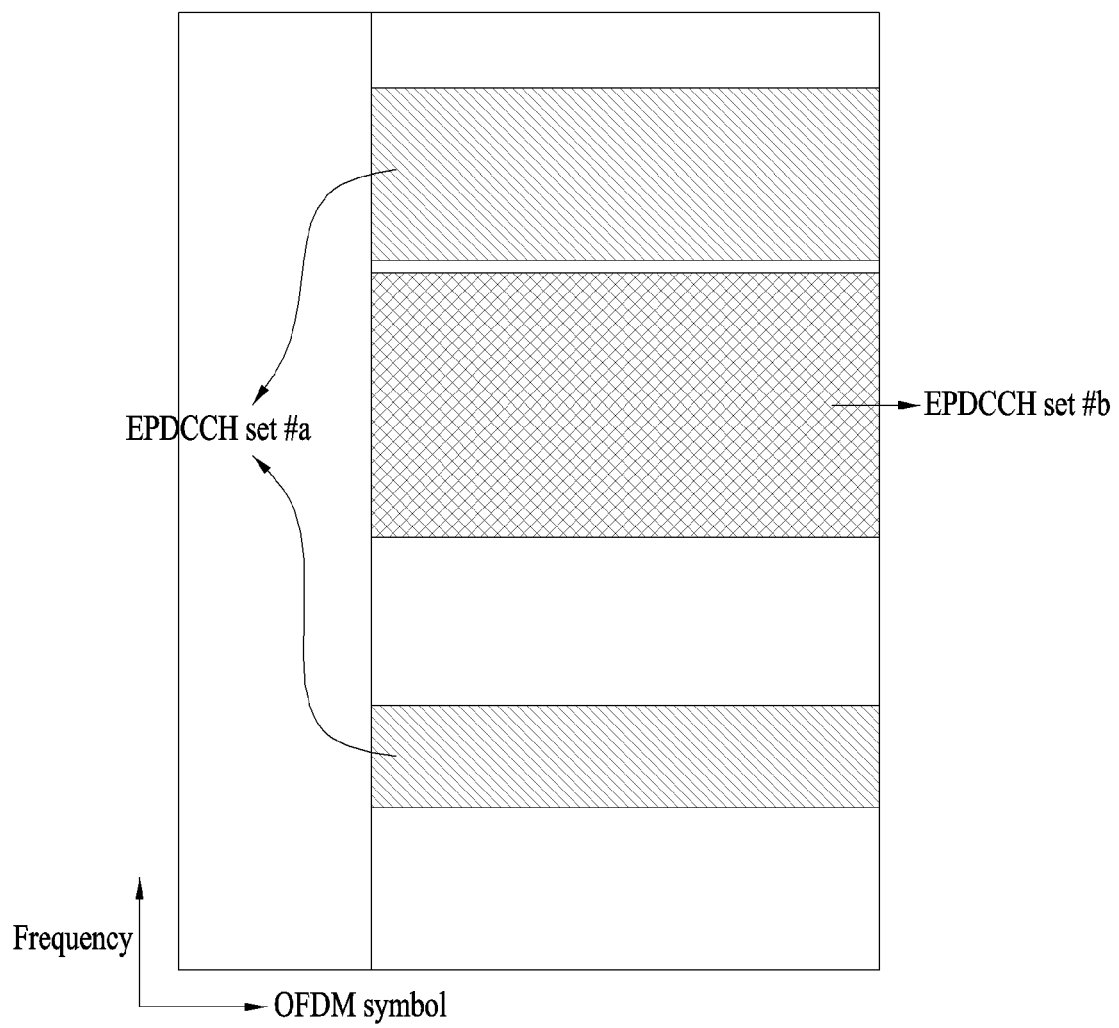
FIG. 11 is a diagram for an example of an EPDCCH set.

FIG. 11 is a diagram for an example of an EPDCCH set. Referring to FIG. 11, K EPDCCH set(s) can be configured per each CC or cell. In this case, the K may be equal to or greater than 1 and equal to or less than a specific limit (e.g., 2). And, each of the EPDCCH set(s) can be configured with the N PRBs (belonging to a PDSCH region). In this case, the N value and PRB resource/index can be independently (i.e., set-specifically) assigned according to an EPDCCH set. Hence, the number and indexes of ECCE resources constructing each EPDCCH set can be (UE-specifically) set-specifically configured. A PUCCH resource/index linked to each ECCE resource/index can also be (UE-specifically) set-specifically assigned by independently configuring a start PUCCH resource/index according to an EPDCCH set. Different EPDCC sets may partially be overlapped on the frequency domain (that is, PRB pair).

The EPDCCH may be transmitted using continuous frequency resources (localized transmission), or may be transmitted using discontinuous frequency resources for frequency diversity (distributed transmission). The ECCE may have different structures depending on the transmission type of the EPDCCH. In more detail, the ECCE (hereinafter, localized ECCE, L-ECCE) for localized transmission may include REs (or EREGs) which belong to the same PRB pair, and ECCE (hereinafter, distributed ECCE, D-ECCE) for distributed transmission may include REs (or EREGs) extracted from a plurality of PRB pairs. One EPDCCH set may support both localized transmission and distributed transmission, or may support one of the localized transmission and the distributed transmission. If one EPDCCH set supports both the localized transmission and the distributed transmission, the EPDCCH set includes both L-ECCE and D-ECCE. On the other hand, if one EPDCCH set supports only one of the localized transmission and the distributed transmission, the corresponding EPDCCH set includes only one of L-ECCE and D-ECCE. The EPDCCH set that supports localized transmission only may be referred to as localized EPDCCH set, and the EPDCCH set that supports distributed transmission only may be referred to as distributed EPDCCH set.

Figure 12:
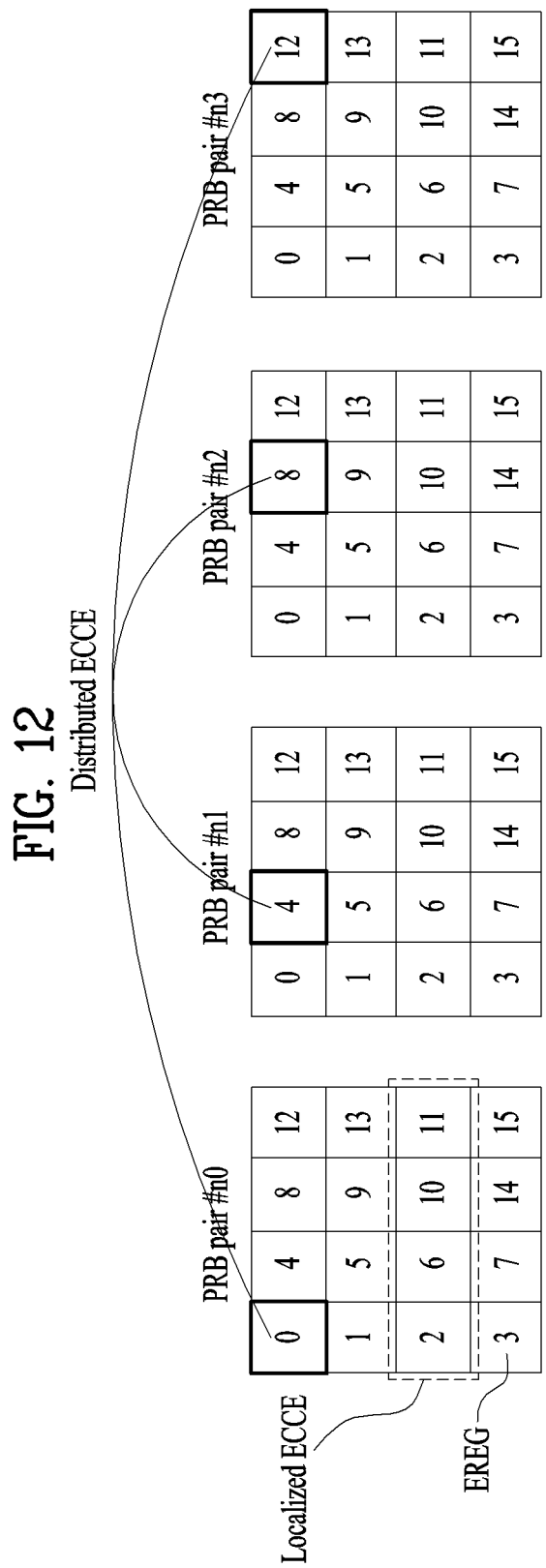
FIG. 12 is a diagram illustrating ECCE (Enhanced Control Channel Element) and EREG (Enhanced Resource Element Group)

FIG. 12 is a diagram illustrating ECCE (Enhanced Control Channel Element) and EREG (Enhanced Resource Element Group). Referring to FIG. 12, one ECCE may include four EREGs, one PRB pair may include four ECCEs, and one EPDCCH set may include four PRB pairs. In this case, the L-ECCE includes REs (for example, [EREG #0 of PRB pair #n0, EREG #4 of PRB pair #n0, EREG #8 of PRB pair #n0, EREG #12 of PRB pair #n0]) which belong to the same PRB pair. On the other hand, the D-ECCE includes REs (for example, [EREG #0 of PRB pair #n0, EREG #4 of PRB pair #n1, EREG #8 of PRB pair #n2, EREG #12 of PRB pair #n3]) extracted from a plurality of PRB pairs.

Embodiment

EPDCCH Search Space

One EPDCCH set or several EPDCCH sets may exist within a downlink system band, and a localized ECCE (L-ECCE) and a distributed ECCE (D-ECCE) coexist within the same PRP pair. For example, the L-ECCE and the D-ECCE may be configured to coexist within one EPDCCH set, or resources constituting the localized EPDCCH set and resources constituting the distributed EPDCCH set may partially be overlapped with each other. At this time, for efficiency of multiplexing, it is preferable that allocation of ECCE of a special mode (localized mode or distributed mode) affects allocation of ECCE of another mode within the minimum range. This is because that if the EPDCCH is transmitted from the L-ECCEs or the D-ECCEs in a state that all or some of the L-ECCEs and the D-ECCEs collide with one another, EPDCCH transmission is blocked in the other ECCEs where collision occurs.

Figure 13:
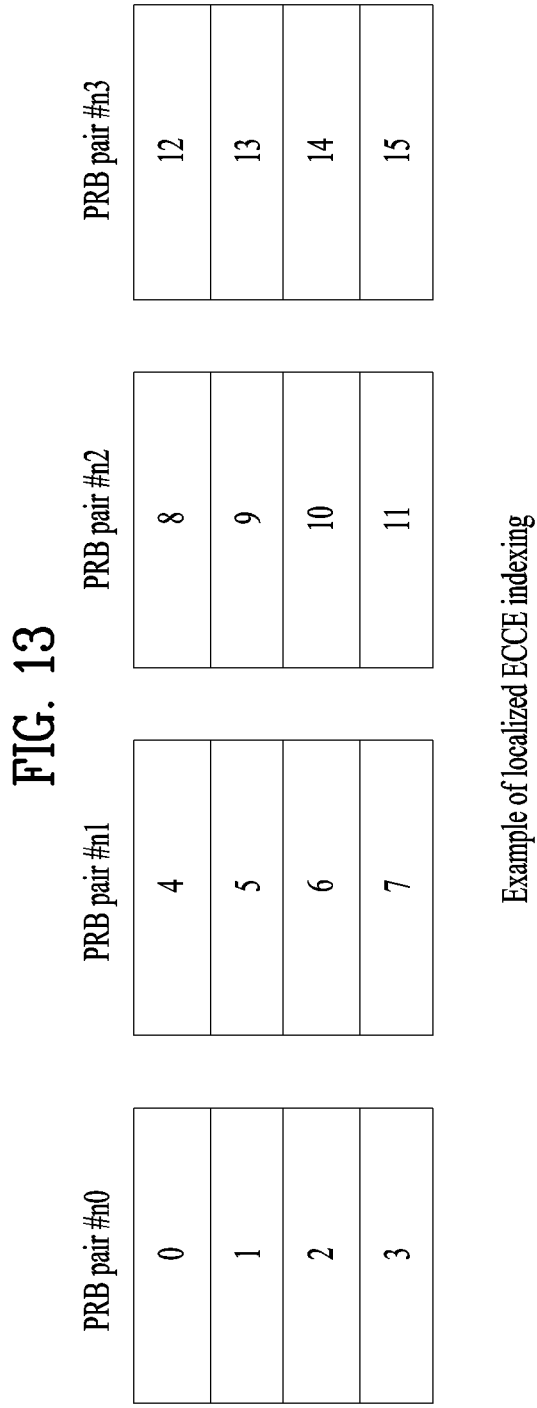
FIG. 13 is a diagram illustrating L-ECCE (Localized ECCE)
Figure 14:
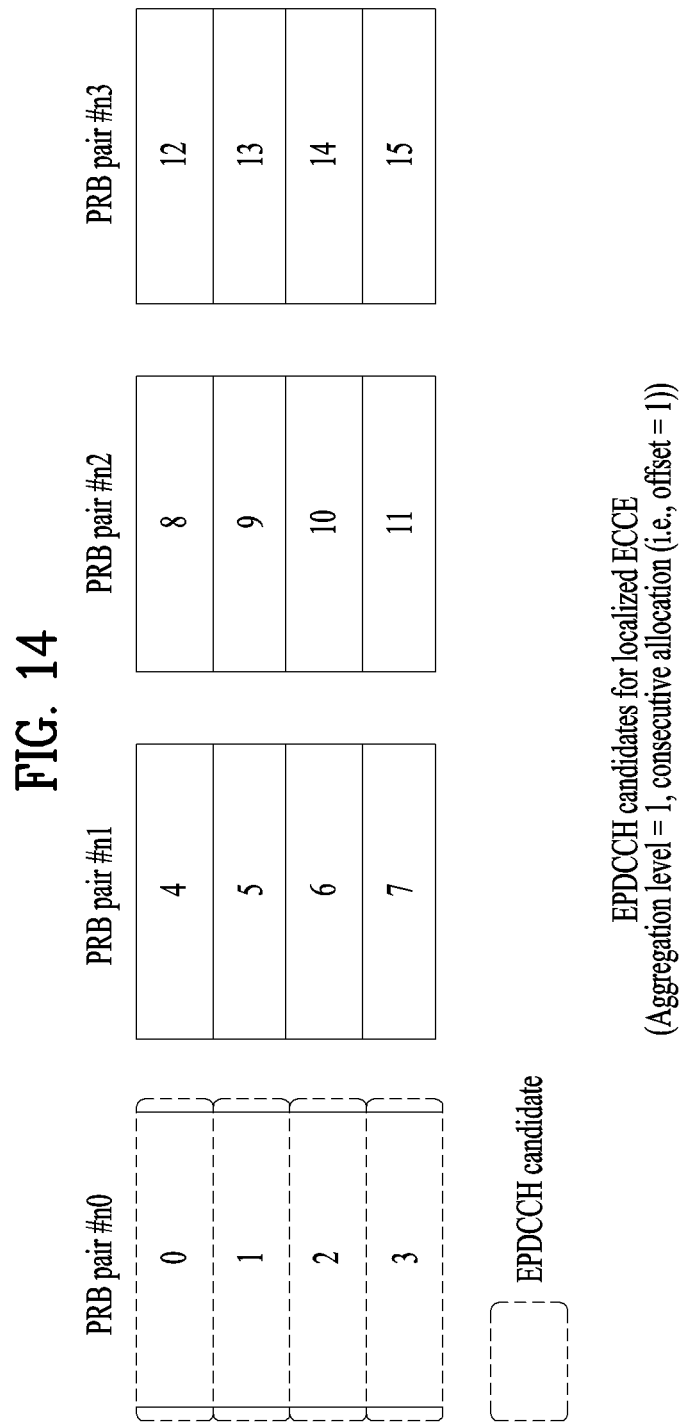
FIGS. 14 and 15 are diagrams illustrating EPDCCH candidates on L-CCE.
Figure 15:
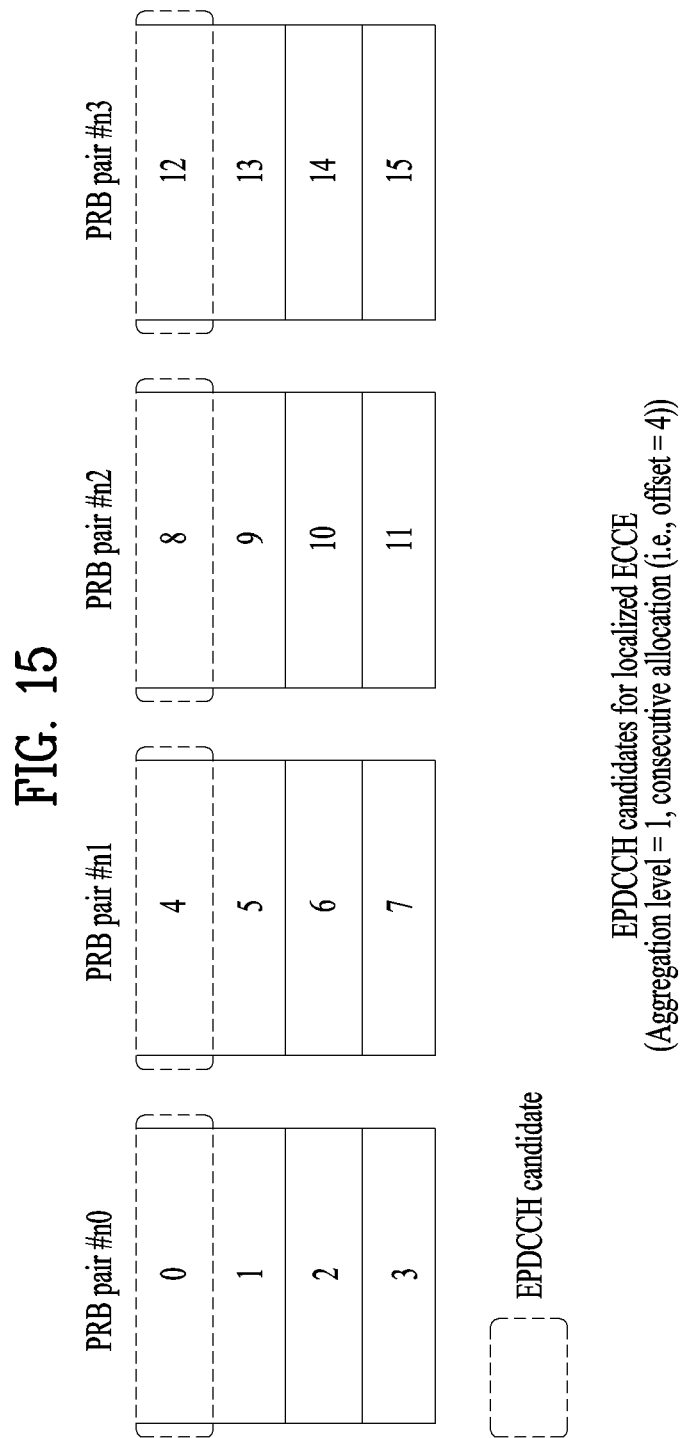

In the meanwhile, if the EPDCCH is transmitted in accordance with localized transmission, it is preferable that EPDCCH candidates are distributed within the EPDCCH set. For example, it is assumed that L-ECCE indexes are given sequentially within one PRB pair as shown in FIG. 13 and given sequentially within next PRB pair. In this case, it is more preferable that EPDCCH candidates of the L-ECCE are distributed within each PRB pair as shown in FIG. 15 than that the EPDCCH candidates are concentrated on a specific PRB pair as shown in FIG. 14. In this case, in view of the EPDCCH set, the EPDCCH candidates for localized transmission are distributed equally within the search space. In FIGS. 14 and 15, offset represents space between first ECCEs used to transmit each EPDCCH candidate.

On the other hand, in D-ECCEs, EREGs constituting ECCEs are uniformly distributed in one or more PRB pairs. At this time, a group of EREGs comprised of ERE indexes (e.g., EREGs #0, 4, 8, 12) corresponding to D-ECCE within the EPDCCH set may be defined as an EREG group as shown in FIG. 16. At this time, if the D-ECCE comprised of 4 EREGs is used for EPDCCH transmission, E-PDCCH transmission is blocked for four L-ECCEs (for example, L-ECCEs #0, #4, #8, #12 in FIG. 15) overlapped with the corresponding EREG group (for example, EREG group #0). Therefore, if the L-ECCEs and the D-ECCEs coexist in the same PRB pair, it is preferable that the EPDCCH candidates of the L-ECCE exist in different EREG groups to allow EREG constituting the D-ECCE to overlap the L-ECCE within the minimum range.

Therefore, if the L-ECCE and the D-ECCE are multiplexed into one EPDCCH pair, it is preferable that the EPDCCH candidates for the L-ECCE satisfy all/some of the following conditions.

Condition 1: The EPDCCH candidates are distributed in different PRB pairs if possible.
Condition 2: The EPDCCH candidates are distributed in different EREG groups if possible.

Since the D-ECCE is distributed into one or more PRB pairs, degree of freedom for avoiding collision with the L-ECCE by controlling the location of the EPDCCH candidates (that is, distributed EPDCCH candidates) of the D-ECCE is relatively low. Therefore, the present invention suggests a method for avoiding collision between the L-ECCE and the D-ECCE by properly controlling the location of the EPDCCH candidates (that is, localized EPDCH candidates) of the L-ECCE. To this end, the present invention may consider a method for reducing collision between the L-ECCE and the D-ECCE by using controlling offset of a hashing function, which is used to determine the location of the EPDCCH candidates of the L-ECCE or controlling the number of the EPDCCH candidates of the L-ECCE.

First of all, a method for determining offset of a hashing function, which is used to determine an EPDCCH search space, to satisfy the conditions 1 and 2 will be described. The hashing function for the EPDCCH search space may have the same/similar structure as and to that of the existing Equation 1. For example, in the Equation 1, $N_{CCE,k}$ may be replaced with $N_{ECCE,k}$. $N_{ECCE,k}$ represents the number of ECCEs within the EPDCCH set at the subframe #k. Simply, if the EPDCCH candidates are distributed uniformly in the EPDCCH search space, offset between the EPDCCH candidates may be configured at constant intervals like $$\left\lfloor \frac{N_{CCE,k}}{M_p^{(L)}} \right\rfloor$$

Figure 17:
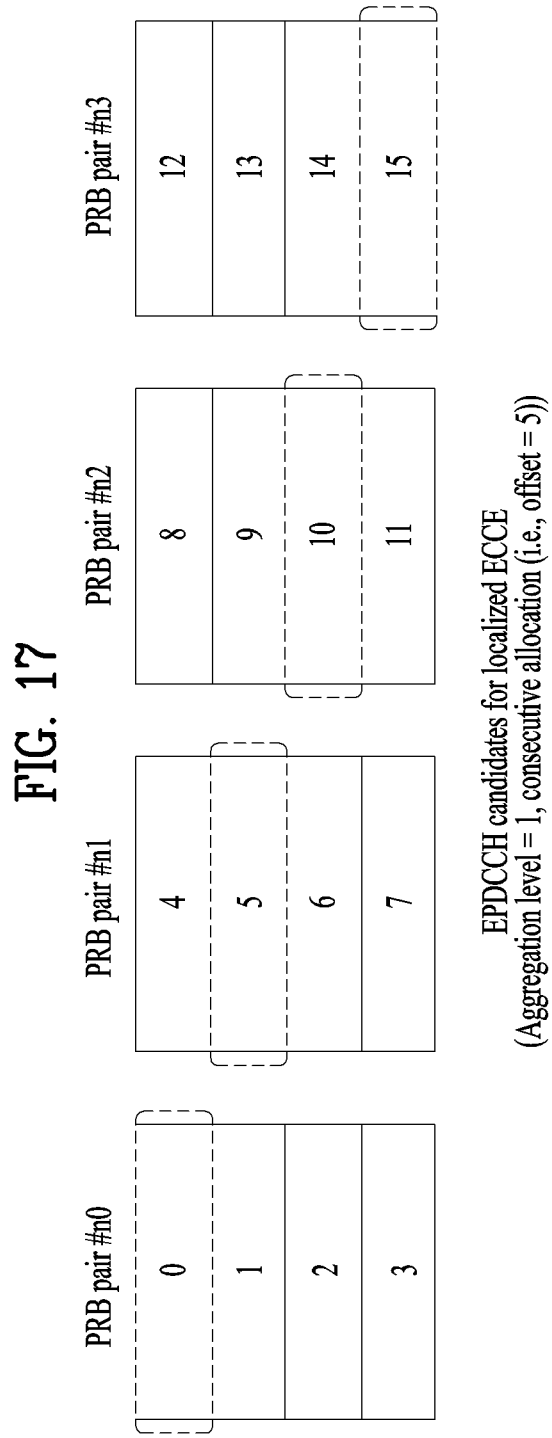
FIGS. 17 to 19 are diagrams illustrating examples of transmission of EPDCCH candidates according to the present invention.

(this is equivalent to substitution of $$\left\lfloor \frac{N_{CCE,k}}{M_p^{(L)}} \right\rfloor$$

for the first coefficient of the Equation 1). In this case, $M_p^{(L)}$ represents the number of EPDCCH candidates of which aggregation level is L in the EPDCCH set. Also, if offset equivalent to the number of ECCEs is given per PRB pair, the EPDCCH candidates may be distributed uniformly such that one EPDCCH candidate may be arranged for each PRP pair (this is equivalent to substitution of $N_{CP}$ for the first coefficient of the Equation 1). Although these EPDCCH candidates may be distributed as shown in FIG. 15 to satisfy the condition 1, the EPDCCH candidates may fail to satisfy the condition 2. Therefore, as a method for satisfying the conditions 1 and 2, offset between the EPDCCH candidates may be controlled to be greater than the number of ECCEs per PRB pair. In this case, to avoid the case where two different EPDCCH candidates are allocated to the same PRB pair or distributed in the same EREG group, offset between the EPDCCH candidates may be determined to be coprime integers (e.g., 5) with the number (e.g., 4) of ECCEs per PRB pair, among numbers greater than the number of ECCEs per PRB pair, as shown in FIG. 17. If a plurality of coprime integers with the number (e.g., 4) of ECCEs per PRB pair exist, a prime number having the smallest value may be used as offset. In this case, offset between the EPDCCH candidates represents spacing between first L-ECCEs of L number of L-ECCEs to which each EPDCCH candidate is allocated, and has a unit of L-ECCE. In this case, L represents an aggregation level.

In more detail, as shown in FIGS. 13 to 15 and FIG. 17, if L-ECCE indexes are given sequentially, the hashing function of the Equation 1 may be modified as follows. The following Equation expresses $ECCE(n_{ECCE})$ corresponding to EPDCCH candidate #m.

$$A \cdot \left\{ (Y_k + m) \bmod \left\lfloor \frac{N_{CCE,k}}{L} \right\rfloor \right\} + i \qquad \text{[Equation 5]}$$

In this case, A represents the offset value suggested as above. For example, A may be a value greater than the number of ECCEs per PRB pair, among integers greater than L.

In this case, index of PRB pair to which $n_{ECCE}$th L-ECCE belongs and EREG index of the j-th EREG of the corresponding L-ECCE within the corresponding PRB pair may be expressed as follows.

$$-PRB\ \text{pair}\ \#:\ \left\lfloor \frac{n_{ECCE}}{N_{CP}} \right\rfloor \text{(see FIG. 13)} \quad \text{[Equation 6]}$$

EREG #: $(n_{ECCE} \bmod N_{CP}) + j*N_{CP}$ (see FIGS. 12 and 16)

In this case, $n_{ECCE}=0, 1, \ldots, N_{ECCE}-1$, $N_{ECCE}$ represents the number of ECCEs within the EPDCCH set, $N_{CP}$ represents the number of ECCEs per PRB pair, $j=0, 1, \ldots, N-1$, and N represents the number of EREGs per ECCE. $\lfloor\ \rfloor$ represents a floor function.

Figure 18:
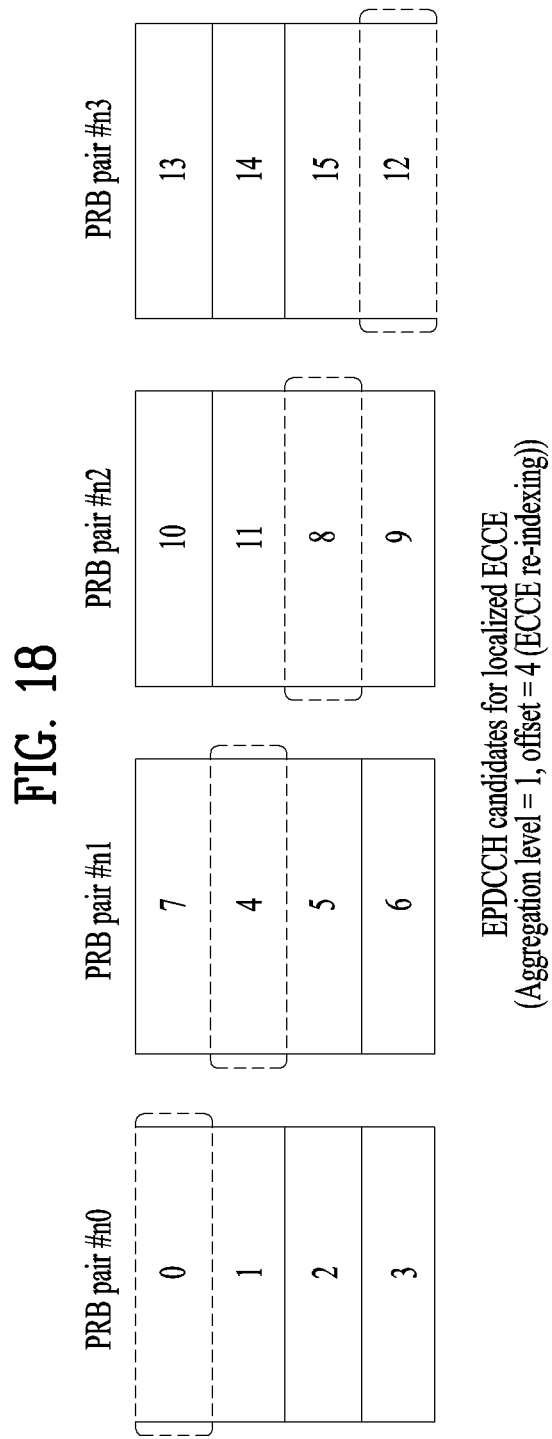

As another method, indexing of the L-ECCE may be configured differently per PRB pair. That is, the distributed ECCE is indexed in the same manner in all the PRB pairs, whereas the L-ECCE may be indexed PRB pair-specifically. For example, when L-ECCE index of a specific PRB pair (for convenience, reference PRB pair) is given at a special pattern (e.g., indexing to ECCEs #0~3 in accordance with EREG groups #0~3), indexing may be given in such a manner that the index pattern of the reference PRB pair is permuted and then indexes are given to the L-ECCE of the other PRB pair in due order. For another example, L-ECCE indexes (per PRB pair) are given to the entire L-ECCEs in due order and then L-ECCE index may be permuted per PRB pair by using a permutation function having PRB index as a factor. For another example, L-ECCE indexes may be cyclic-shifted per PRB pair. For example, as shown in FIG. 18, L-ECCE indexes are given to the entire L-ECCEs in due order, and then the L-ECCE indexes may be cyclic-shifted from the second PRB pair in accordance with PRB indexes. In this case, even though the EPDCCH candidates are arranged on the L-ECCE indexes at constant intervals (for example, even though offset between the EPDCCH candidates is the same as the number of L-ECCEs per PRB pair), the EPDCCH candidates may be allocated to their respective EREG groups different from each other.

Figure 19:
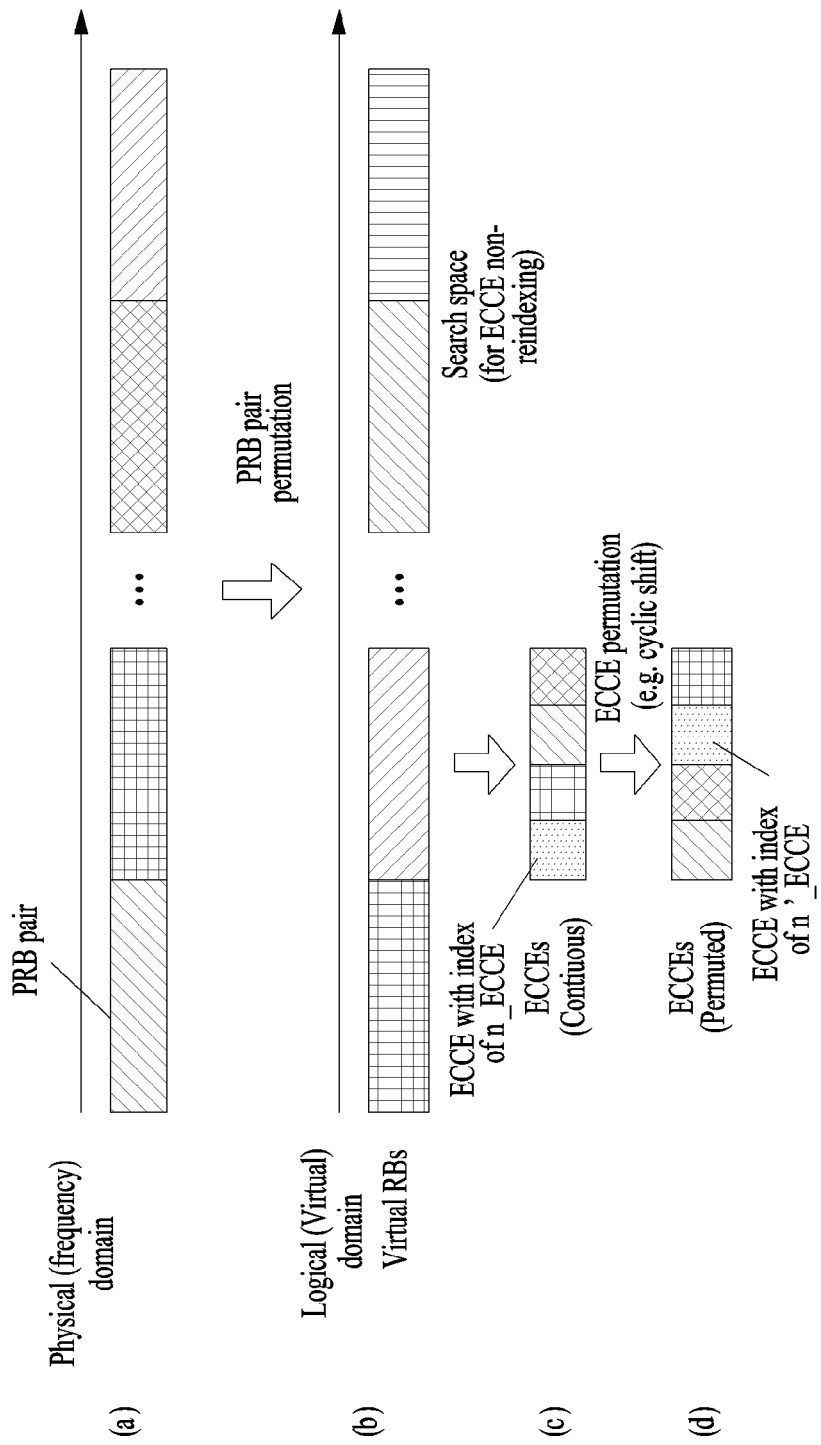

The aforementioned method for modifying ECCE indexing may be applied to the case where actual factors such as offset value applied to the existing hashing function (for example, Equation 1) are used without modification. Hereinafter, the method for modifying ECCE indexing will be described in more detail using the Equation with reference to FIG. 18. In FIG. 18, the same indexes as those of FIG. 15 are used as the indexes of the ECCEs corresponding to the EPDCCH candidates. However, the EPDCCH candidates are distributed on a logic domain of the search space in the same manner as FIG. 17. In case of the existing manner, PRB pairs (FIG. 19(a)) are virtually permuted and allocated on the logic domain to form the search space (FIGS. 19(b) and (c)). However, in the present invention, it is to be understood that the PRB pairs may be permuted (within each virtual RB) once more in a unit of ECCE as shown in FIG. 19(d). Therefore, the two conditions (that is, PRB pair condition (condition 1), EREG group condition (condition 2)) for the EPDCCH candidates of the L-ECCE may be satisfied while the existing hashing function is being used. In the example of FIG. 18, the ECCE within the PRB pair is cyclic shifted in accordance with the PRB pair index, and a new L-ECCE index $n'_{ECCE}$ which is subjected to re-indexing may be given as follows.

$$n'_{ECCE} = \left\lfloor \frac{n_{ECCE}}{N_{CF}} \right\rfloor * N_{CP} + \left\{ \left( n_{ECCE} + \left\lfloor \frac{n_{ECCE}}{N_{CP}} \right\rfloor \right) \bmod N_{CP} \right\} \quad \text{[Equation 7]}$$

In this case, $n_{ECCE}=0, 1, \ldots, N_{ECCE}-1$, $N_{ECCE}$ is the number of ECCEs within the EPDCCH set, $N_{CP}$ is the number of ECCEs per PRB pair, and $\lfloor\ \rfloor$ is a floor function.

If ECCE re-indexing is not applied, the user equipment may try blind decoding by using ECCE having index $n_{ECCE}$ as shown in FIG. 19(c). However, if ECCE re-indexing is applied, the user equipment may try blind decoding by using ECCE having index $n'_{ECCE}$, which is permuted, as shown in FIG. 19(d) instead of the value of $n_{ECCE}$. In this case, application of ECCE re-indexing/re-indexing method may be configured through a higher layer signal (for example, RRC layer), or may be indicated through a signal of a physical layer.

Index of the PRB pair to which the $n'_{ECCE}$th L-ECCE belongs and EREG index of the j-th EREG of the corresponding ECCE within the corresponding PRB pair may be given as follows.

$$-PRB\ \text{pair}\ \#:\ \left\lfloor \frac{n'_{ECCE}}{N_{CP}} \right\rfloor \quad \text{[Equation 8]}$$

$$-EREG\ \#:\ (n'_{ECCE} \bmod N_{CP}) + j*N_{CP}$$

In this case, $n'_{ECCE}=0, 1, \ldots, N_{ECCE}-1$, $N_{ECCE}$ represents the number of ECCEs within the EPDCCH set, $N_{CP}$ represents the number of ECCEs per PRB pair, $j=0, 1, \ldots, N-1$, and N represents the number of EREGs per ECCE. $\lfloor\ \rfloor$ represents a floor function.

In the meanwhile, the above method may be considered that EREG index within the PRB pair is cyclic-shifted in accordance with a cyclic shift value based on PRB pair index. If ECCE re-indexing is applied, index of PRB pair to which the $n_{ECCE}$ th L-ECCE belongs and EREG index of the j-th EREG of the corresponding ECCE within the corresponding PRB pair may be obtained as follows by substituting the Equation 7 for the Equation 8.

$$-PRB\ \text{pair}\ \#:\ \left\lfloor \frac{n'_{ECCE}}{N_{CP}} \right\rfloor = \left\lfloor \frac{\left\lfloor \frac{n_{ECCE}}{N_{CP}} \right\rfloor * N_{CP} + \left\{ \left( n_{ECCE} + \left\lfloor \frac{n_{ECCE}}{N_{CP}} \right\rfloor \right) \bmod N_{CP} \right\}}{N_{CP}} \right\rfloor = \left\lfloor \frac{n_{ECCE}}{N_{CP}} \right\rfloor \quad \text{[Equation 9]}$$

$$-EREG\ \#:\ (n'_{ECCE} \bmod N_{CP}) + 1*N_{CP} =$$

$$\left( \left\lfloor \frac{n_{ECCE}}{N_{CP}} \right\rfloor * N_{CP} + \left\{ \left( n_{ECCE} + \left\lfloor \frac{n_{ECCE}}{N_{CP}} \right\rfloor \right) \bmod N_{CP} \right\} \bmod N_{CP} \right) + j*N_{CP} =$$

$$\left\{ \left( n_{ECCE} + \left\lfloor \frac{n_{ECCE}}{N_{CP}} \right\rfloor \right) \bmod N_{CP} \right\} + j*N_{CP}$$

Therefore, supposing that L number of ECCE indexes $n_{ECCE}$ corresponding to the EPDCCH candidate #m are obtained through hashing functions (for example, Equations 1, 5, 10, etc.), if ECCE re-indexing is not applied, PRB and EREG corresponding to $n_{ECCE}$ may be obtained in accordance with the Equation 6, and if ECCE re-indexing is applied, PRB and EREG corresponding to $n_{ECCE}$ may be obtained in accordance with the Equation 9.

Next, a method for distributing EPDCCH candidates within an EPDCCH set by controlling the number of the EPDCCH candidates will be described. In this case, it is assumed that a plurality of EPDCCH sets (for example, 'one localized EPDCCH set+one distributed EPDCCH set') exist. In this case, a method for distributing EPDCCH candidates on an L-ECCE domain in a desired format by controlling the number of EPDCCH candidates in the EPDCCH set to a special value may be considered. It is assumed that a hashing function used to determine a search space in the EPDCCH set is given as follows. The following Equation illustrates L-ECCE index (that is, $n_{ECCE}$) corresponding to the EPDCCH candidate #m in the search space of an aggregation level L at a subframe #k. It is assumed that L-ECCEs within the EPDCCH set are subjected to indexing in due order (see FIG. 13).

[Equation 10]

$$L\left\{\left(Y_k + \left\lfloor \frac{m \cdot N_{ECCE}}{L \cdot M_{set}^{(L)}} \right\rfloor\right) \mod \lfloor N_{ECCE}/L \rfloor\right\} + i \quad \text{(CIF is configured)}$$

$$L\left\{\left(Y_{p,k} + \left\lfloor \frac{m \cdot N_{ECCE,p,k}}{L \cdot M_p^{(L)}} \right\rfloor + b\right) \mod \lfloor N_{ECCE,p,k}/L \rfloor\right\} + i \quad \text{(CIF is not configured)}$$

In this case, L is an aggregation level, and $Y_k$ is offset used to designate a start L-ECCE of the search space at the subframe #k. $Y_k$ may be modified per subframe, and may be modified UE-specifically by using C-RNTI, for example. $M_{set}(L)$ represents the number of EPDCCH candidates of which aggregation level is L in the EPDCCH set, $N_{ECCE}$ represents the number of L-ECCEs within the EPDCCH set, m is an integer of $0 \sim M_{set}(L)-1$ indicating EPDCCH candidate index, and i is an integer of $0 \sim L-1$. $\lfloor \ \rfloor$ represents a floor function. Also, b represents a value of CIF (Carrier Indicator Field).

D-ECCE corresponding to the EPDCCH candidate #m in the distributed EPDCCH set may be given using the Equation 10, or may be given using another function.

In the Equation 10, $$\left\lfloor \frac{m \cdot N_{ECCE}}{L \cdot M_{set}^{(L)}} \right\rfloor$$

corresponds to offset between start L-ECCEs of respective EPDCCH candidates. Therefore, the respective EPDCCH candidates are spaced apart from each other at a certain interval if $M_{set}^{(L)}$ is expressed as a format of aliquot of $$\frac{N_{ECCE}}{L}$$

(see FIGS. 15 and 17).

At this time, in accordance with combination of factors constituting the hashing function, L-ECCEs corresponding to the EPDCCH candidates may not be concentrated on a special PRB pair or EREG group as shown in FIG. 17. However, the L-ECCEs of the EPDCCH candidates may be concentrated on a special EREG group as shown in FIG. 15. If the L-ECCEs are concentrated on the special EREG group, collision between the L-ECCE and the D-ECCE may occur as shown in FIG. 16, whereby the probability of EPDCCH block may be increased.

Figure 20:
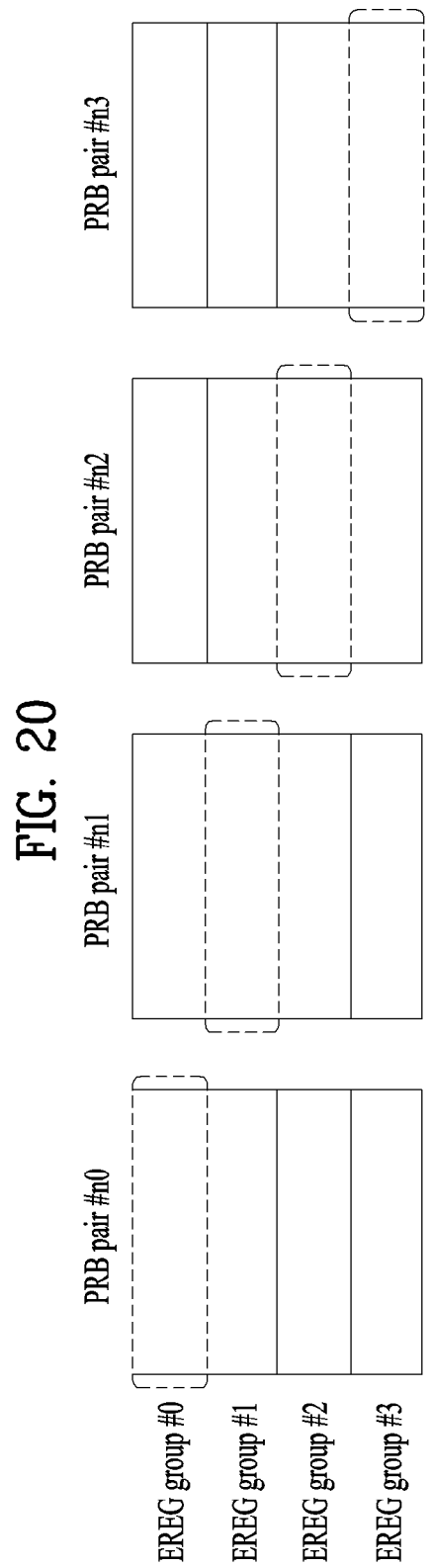
FIGS. 20 and 21 are diagrams illustrating a position of EPDCCH candidates within an EPDCCH set.
Figure 21:
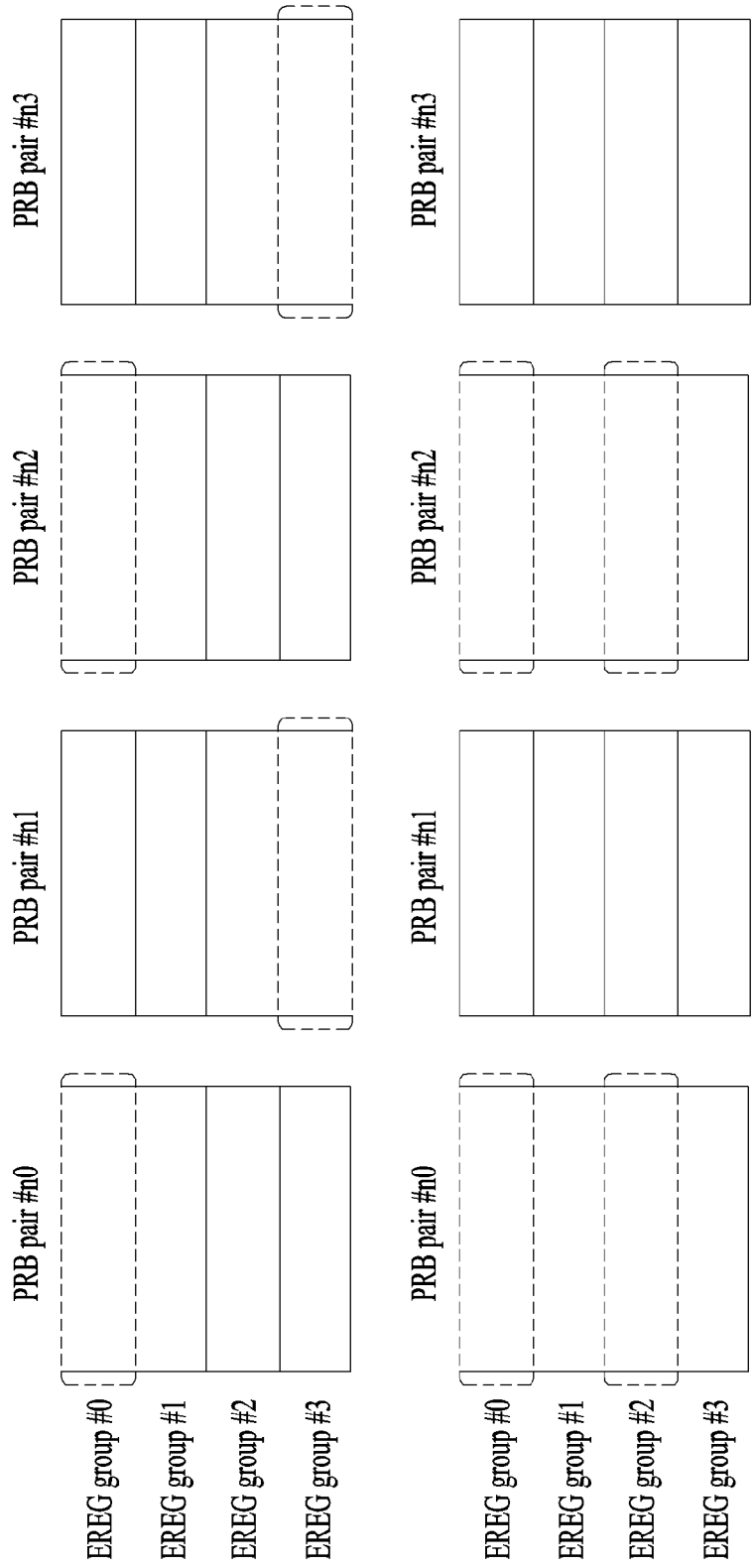

FIG. 20 is a diagram illustrating a preferred distribution of EPDCCH candidates in a localized EPDCCH set, and FIG. 21 is a diagram illustrating that a distribution of EPDCCH candidates in a localized EPDCCH set does not satisfy the aforementioned conditions 1 and 2 (that is, a plurality of EPDCCH candidates are allocated to one PRB pair or one EREG group).

In the meanwhile, it is likely that $N_{ECCE}$ which is the number of ECCEs within the EPDCCH set and the value L corresponding to the aggregation level are given in the form of 2 raised to the power of 2, and since $N_{ECCE}$ is greater than L, the value $N_{ECCE}/L$ is likely to be expressed in the form of 2 raised to the power of 2 (that is, the form of even number). Therefore, as illustrated in Table 2, if the number of EPDCCH candidates is set to an even number, it is likely that the value $M_{set}(L)$ is given as aliquot of $N_{ECCE}/L$. For this reason, the EPDCCH candidates within the EPDCCH set are arranged at constant intervals, whereby L-ECCEs corresponding to the EPDCCH candidates may be concentrated on the special EREG group. Therefore, the EPDCCH sets may be restricted to the localized EPDCCH set such that 1) the value $M_{set}(L)$ may be set so as not to be aliquot of $N_{ECCE}/L$ (that is, prime number), whereby the interval between the EPDCCH candidates on the L-ECCE domain is not uniform, or 2) the value $M_{set}(L)$ may be set to an odd number, whereby the interval between the EPDCCH candidates on the L-ECCE domain is not uniform.

Since the method suggested as above relates to multiplexing between the localized EPDCCH and the distributed EPDCCH, application of the present invention may be considered only in the case that both the localized EPDCCH and the distributed EPDCCH are configured for one user equipment. Also, if the localized EPDCCH and the distributed EPDCCH are configured together, since the localized transmission is mainly valid at a low aggregation level, application of the present invention may be considered at a relatively low aggregation level such as 1 or 2.

Also, although the method suggested as above is described based on the method for determining localized EPDCCH transmission resources in case of multiplexing between the localized EPDCCH and the distributed EPDCCH, the present invention may be applied to even the case where a plurality of EPDCCH sets based on the same transmission method are configured, to increase EPDCCH scheduling flexibility (that is, the probability of EPDCCH block is lowered). For example, even in the case that the localized EPDCCH set+localized EPDCCH set are configured or the distributed EPDCCH set+distributed EPDCCH set are configured, the method suggested as above may be applied to each of the localized EPDCCH set or the distributed EPDCCH set.

Figure 22:
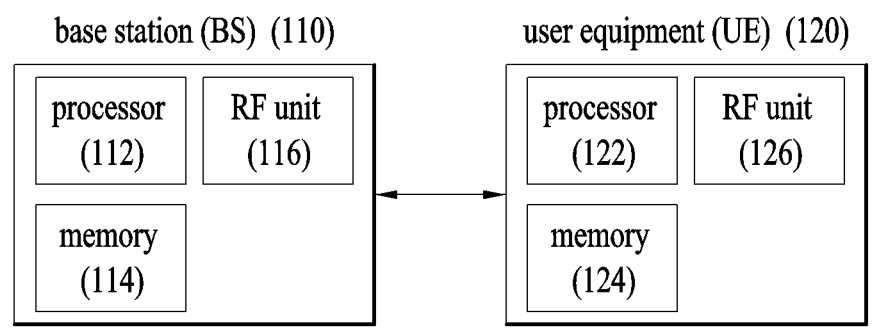
FIG. 22 is a diagram illustrating a base station and a user equipment, which may be applied to the present invention.

FIG. 22 is a diagram for an example of a base station and a user equipment applicable to the present invention. In case that a system includes a relay, the base station or the user equipment can be replaced by the relay.

Referring to FIG. 22, a wireless communication system includes a base station (BS) 110 and a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to the processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention can be used by such a wireless communication device as a user equipment device, a relay, a base station, and the like.

The invention claimed is:

1. A method of receiving an enhanced physical downlink channel (EPDCCH) signal by a user equipment in a wireless communication system, the method comprising:
receiving a subframe including an EPDCCH set, the EPDCCH set including a plurality of EPDCCH candidates; and
monitoring the plurality of EPDCCH candidates in the EPDCCH set in order to receive the EPDCCH signal,
wherein indexes of enhanced control channel elements (ECCEs) corresponding to the plurality of EPDCCH candidates are given by the following Equation:

$$L\left\{\left(Y_k + \left\lfloor \frac{m \cdot N_{ECCE}}{L \cdot M_{set}^{(L)}} \right\rfloor\right) \bmod \lfloor N_{ECCE}/L \rfloor \right\} + i \qquad \text{Equation}$$

where, L represents an aggregation level, and $Y_k$ represents an offset value for a subframe #k, m represents indexes of the EPDCCH candidates, $N_{ECCE}$ represents the number of ECCEs in the EPDCCH set, i is an integer between 0 and L−1, ⌊ ⌋ represents a floor function, and
$M_{set}^{(L)}$ represents the number of EPDCCH candidates of which aggregation level is L in the EPDCCH set and is given as an odd number or a prime number of $$\frac{N_{ECCE}}{L}.$$

2. The method according to claim 1, wherein, if the plurality of EPDCCH sets are configured for the user equipment at the subframe, $M_{set}^{(L)}$ is given as an odd number or a prime number of $$\frac{N_{ECCE}}{L}$$

in at least one aggregation level of all the aggregation levels.

3. The method according to claim 1, wherein, if a localized EPDCCH set and a distributed EPDCCH set are configured for the user equipment at the subframe, $M_{set}^{(L)}$ for the localized EPDCCH set is given as an odd number or a prime number of $$\frac{N_{ECCE}}{L}$$

in at least one aggregation level of all the aggregation levels.

4. The method according to claim 1, wherein, if the EPDCCH sets are localized EPDCCH sets, $M_{set}^{(L)}$ is given as an odd number or a prime number of $$\frac{N_{ECCE}}{L}$$

in at least one aggregation levels of all the aggregation levels.

5. The method according to claim 1, wherein, if the ECCE is a localized ECCE (L-ECCE), $M_{set}^{(L)}$ is given as an odd number or a prime number of $$\frac{N_{ECCE}}{L}$$

in at least one aggregation level of all the aggregation levels.

6. A user equipment configured to receive an enhanced physical downlink channel (EPDCCH) signal in a wireless communication system, the user equipment comprising:
a radio frequency (RF) unit; and
a processor,
wherein the processor is configured to receive a subframe including an EPDCCH set, the EPDCCH set including a plurality of EPDCCH candidates and monitor the plurality of EPDCCH candidates in the EPDCCH set in order to receive the EPDCCH signal, and
indexes of enhanced control channel elements (ECCEs) corresponding to the plurality of EPDCCH candidates are given by the following Equation:

$$L\left\{\left(Y_k + \left\lfloor\frac{m \cdot N_{ECCE}}{L \cdot M_{set}^{(L)}}\right\rfloor\right) \mod \lfloor N_{ECCE}/L\rfloor\right\} + i \quad \text{Equation}$$

where, L represents an aggregation level, and $Y_k$ represents an offset value for a subframe #k, m represents indexes of the EPDCCH candidates, $N_{ECCE}$ represents the number of ECCEs in the EPDCCH set, i is an integer between 0 and L−1, ⌊ ⌋ represents a floor function, and
$M_{set}^{(L)}$ represents the number of EPDCCH candidates of which aggregation level is L in the EPDCCH set and is given as an odd number or a prime number of $$\frac{N_{ECCE}}{L}.$$

7. The user equipment according to claim 6, wherein, if the plurality of EPDCCH sets are configured for the user equipment at the subframe, $M_{set}^{(L)}$ is given as an odd number or a prime number of $$\frac{N_{ECCE}}{L}$$

in at least one aggregation level of all the aggregation levels.

8. The user equipment according to claim 6, wherein, if a localized EPDCCH set and a distributed EPDCCH set are configured for the user equipment at the subframe, $M_{set}^{(L)}$ for the localized EPDCCH set is given as an odd number or a prime number of $$\frac{N_{ECCE}}{L}$$

in at least one aggregation levels of all the aggregation levels.

9. The user equipment according to claim 6, wherein, if the EPDCCH sets are localized EPDCCH sets, $M_{set}^{(L)}$ is given as an odd number or a prime number of $$\frac{N_{ECCE}}{L}$$

in at least one aggregation level of all the aggregation levels.

10. The user equipment according to claim 6, wherein, if the ECCE is a localized ECCE (L-ECCE), $M_{set}^{(L)}$ is given as an odd number or a prime number of $$\frac{N_{ECCE}}{L}$$

in at least one aggregation level of all the aggregation levels.

* * * * *